(12) United States Patent
Wu et al.

(10) Patent No.: US 7,944,984 B1
(45) Date of Patent: *May 17, 2011

(54) I/Q CALIBRATION IN THE PRESENCE OF PHASE OFFSET

(75) Inventors: Songping Wu, Sunnyvale, CA (US);
Qing Zhao, Santa Clara, CA (US); Atul Salhotra, Sunnyvale, CA (US);
Hui-Ling Lou, Palo Alto, CA (US);
Thomas B. Cho, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1130 days.

This patent is subject to a terminal disclaimer.

(21) Appl. No.: 11/705,248

(22) Filed: Feb. 12, 2007

Related U.S. Application Data

(60) Provisional application No. 60/790,878, filed on Apr. 11, 2006.

(51) Int. Cl.
*H04L 5/12* (2006.01)
(52) U.S. Cl. .................................... 375/261; 375/343
(58) Field of Classification Search .............. 375/261, 375/343, 322; 341/118, 119, 120, 144, 155; 455/115.1, 126, 323
See application file for complete search history.

(56) References Cited

U.S. PATENT DOCUMENTS

| | | | | |
|---|---|---|---|---|
| 5,371,481 A * | 12/1994 | Tiittanen et al. | ............... | 332/103 |
| 5,903,823 A * | 5/1999 | Moriyama et al. | ............ | 455/126 |
| 6,044,112 A * | 3/2000 | Koslov | ........................... | 375/235 |
| 6,340,883 B1 * | 1/2002 | Nara et al. | ................. | 324/76.78 |
| 6,763,227 B2 * | 7/2004 | Kramer | ..................... | 455/115.1 |
| 7,346,122 B1 * | 3/2008 | Cao | .............................. | 375/296 |
| 7,382,297 B1 * | 6/2008 | Kopikare et al. | ............. | 341/118 |
| 7,480,348 B2 * | 1/2009 | Nakano | ......................... | 375/324 |
| 7,647,026 B2 * | 1/2010 | Darabi | ....................... | 455/67.13 |
| 2003/0174783 A1 * | 9/2003 | Rahman et al. | ............... | 375/298 |
| 2003/0231723 A1 * | 12/2003 | Hansen | ........................ | 375/343 |
| 2004/0146120 A1 * | 7/2004 | Brown | .......................... | 375/322 |
| 2005/0075815 A1 * | 4/2005 | Webster et al. | .............. | 702/106 |
| 2005/0148304 A1 * | 7/2005 | Jerng | ............................. | 455/75 |
| 2005/0152463 A1 * | 7/2005 | DeChamps et al. | ......... | 375/260 |

OTHER PUBLICATIONS

ANSI/IEEE Std 802.11, 1999 Edition; Information technology—Telecommunications and information exchange between—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.
IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner* — Shuwang Liu
*Assistant Examiner* — Helene Tayong

(57) ABSTRACT

An I/Q calibration system for a quadrature amplitude modulation (QAM) mode transceiver includes a signal generator that generates reference in-phase (I) and quadrature (Q) signals. An I/Q mismatch compensation module generates compensated I and Q signals based on the reference I and Q signals and amplitude and phase correction signals. An I/Q mismatch calibration module generates the amplitude and phase correction signals. A phase stepper module varies a phase of the reference I and Q signals based on the amplitude and phase correction signals.

42 Claims, 16 Drawing Sheets

OTHER PUBLICATIONS

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h—2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

802.11n; IEEE P802.11-04/0889r6; Wireless LANs, TGn Sync Proposal Technical Specification; May 2005; 131 pages.

IEEE Std 802.16-2004 (revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

* cited by examiner

I/Q CALIBRATION IN THE PRESENCE OF PHASE OFFSET

CROSS-REFERENCE TO RELATED APPLICATIONS

This application is related to U.S. patent application Ser. No. 11/503,044 filed Aug. 11, 2006, and claims the benefit of U.S. Provisional Application No. 60/790,878, filed on Apr. 11, 2006. The disclosures of the above applications are incorporated herein by reference in their entirety.

FIELD

The present disclosure relates to correcting amplitude and/or phase mismatch in quadrature amplitude modulation (QAM) mode transmitters.

BACKGROUND

QAM mode transmitters generate a radio frequency (RF) signal that is formed by adding modulated sinusoid and cosine carriers, which are also referred to as in-phase (I) and quadrature (Q) signals, respectively. The I and Q signals can be digitally generated at a lower frequency and then upconverted to a carrier frequency. The I and Q signals can be upconverted with a pair of analog mixers—one mixer for the I signal and the other mixer for the Q signal. The analog mixers are generally less expensive than their digital counterparts and therefore more popular.

In an ideal case, the amplitudes of the unmodulated I and Q signals are equal and the I and Q signals are exactly 90° out of phase with each other. However, variances in the analog mixer pairs distort or mismatch these relationships. The mismatch is referred to as I/O mismatch. Since a receiver may incorrectly interpret the I/Q mismatch as an information signal, it is important for the transmitter to minimize the I/Q mismatch.

Referring now to FIG. 1, a functional block diagram is shown of an I/Q-mismatch compensated transceiver 10 according to the prior art. Transceiver 10 includes a transmitter section 12, a receiver section 14, and an I/Q mismatch calibration section 16.

Transmitter section 12 includes an I/O predistortion module 24 that compensates the magnitude and/or phase relationship of I and Q signals. The compensation is based on an amplitude correction signal $\alpha_{est}$ and a phase correction signal $\beta_{est}$, referred to collectively as correction signals, that are generated by calibration section 16. I/O predistortion module 24 compensates for the I/Q mismatch that may be introduced by a pair of analog mixers included in an analog transmitter 30.

During a calibration sequence, a loopback switch 44 is closed and couples the output of transmitter section 12 to an input of receiver section 14. Calibration section 16 then measures the I/Q mismatch introduced by the mixers in analog transmitter 30. Calibration section 16 generates the correction signals based on the measurement. I/Q predistortion module 24 then compensates the magnitude and/or phase relationship of the I and Q signals to eliminate the I/Q mismatch at the outputs of analog transmitter 30.

A transmit filter module 26 filters harmonics from the I and Q signals. Outputs of transmit filter module 26 communicate the I and Q signals to respective inputs of a digital-to-analog converter (DAC) 28. DAC 28 converts the digital I and Q signals to corresponding analog signals. The analog I and Q signals communicate with respective inputs of analog transmitter 30.

Receiver section 14 includes an analog receiver 32. Analog receiver 32 includes a second pair of analog mixers that regenerate the I and Q signals from the RF carrier. The second pair of analog mixers introduces additional I/Q mismatch into the received I and Q signals. An analog-to-digital converter (ADC) 36 converts the analog I and Q signals into digital I and Q signals. A receive low-pass filter (LPF) 36 filters harmonic frequencies and communicates the filtered I and Q signals to a receive I/O compensation module 38. I/O compensation module 38 compensates the digital I and Q signals based on the correction signals from calibration section 16 and compensates for the I/Q mismatch that was introduced by analog receiver 32.

Based on a DO_CALIB signal, a demultiplexer 40 routes the compensated I and Q signals to calibration section 16 or a carrier recovery module 42. The DO_CALIB signal, and a CALIB_MODE signal that is used by a demultiplexer 50, are asserted while transceiver 10 is being calibrated for I/Q mismatch.

Calibration section 16 includes an I/Q calibrator module 48 that measures the I/Q mismatch between I and Q signals that enter calibration section 16. I/Q calibrator module 48 then generates the correction signals based on the I/Q mismatch. Based on the CALIB_MODE signal, a demultiplexer 50 then routes the correction signals to transmit I/Q predistortion module 24 or receive I/Q compensation module 38.

Operation of transceiver 10 will now be described. Transceiver 10 supports three operating modes—a receiver calibration mode, a transmitter calibration mode, and a normal operating mode. The I/O mismatch calibration process begins in the receiver calibration mode.

In the receiver calibration mode loopback switch 44 is opened, a switch 46 is closed, and the DO_CALIB and CALIB_MODE signals are set equal to "1". Switch 46 connects the input of analog receiver 32 to a source 52. Source 52 generates a reference RF carrier that includes ideal I and Q signals. The analog mixers in analog receiver 32 introduce receiver I/Q mismatch to the ideal I and Q signals. I/Q calibrator module 48 measures the receiver I/Q mismatch and based thereon generates the correction signals. Demultiplexer 50 routes the correction signals to receive I/Q compensation module 38. I/Q compensation module 38 stores the correction signal values and thereafter compensates the received I and Q signals to eliminate the receiver I/Q mismatch.

Transceiver 10 then enters the transmitter calibration mode. In the transmitter calibration mode switch 46 is opened, loopback switch 44 is closed, the DO_CALIB signal is set equal to "1", and the CALIB_MODE signal is set equal to "0". Since receiver section 14 has already been compensated, I/Q calibrator module 48 can measure the transmitter I/Q mismatch and generate the correction signals for transmitter section 12. Demultiplexer 50 routes the correction signals to I/Q predistortion module 24. I/Q predistortion module 24 stores the correction signal values and thereafter compensates the I and Q signals to eliminate the transmitter I/Q mismatch. The normal operating mode can then be entered by opening loopback switch 44 and switch 46, and setting the DO_CALIB and CALIB_MODE signals equal to "0".

Referring now to FIG. 2, a transmitter 60 is shown that employs an alternate method of generating the correction signals for I/Q predistortion module 24. A spectrum analyzer 62 monitors the RF carrier signal while known data signals are communicated into I/Q predistortion module 24. Spectrum analyzer 62 then measures the I/Q mismatch introduced by analog transmitter 30 and generates the correction signals accordingly. I/Q predistortion module 24 stores the correction signals and compensates the I and Q signals accordingly.

The above methods calibrate transmitters 10 and 60 for I/Q mismatch at a single frequency. The methods can be repeated to calibrate for I/Q mismatch at a number of frequencies. For example, unique correction signals can be generated for corresponding RF bands and/or frequencies used by the Institute of Electrical and Electronics Engineers (IEEE) standards 802.11, 802.11a, 802.11b, 802.11g, 802.11h, 802.11n, 802.16, and 802.20, and/or used by the Bluetooth Special Interest Group (SIG) Bluetooth standard. The aforementioned standards are hereby incorporated by reference in their entirety. I/Q predistortion module 24 can then store the plurality of correction values and use the correction values associated with the carrier frequency being used.

While the above circuits and methods address the issue of I/Q mismatch, they include some undesirable aspects. For example, the method used with transmitter section 12 is dependent on calibrating receiver section 14. If receiver section 14 is improperly calibrated then the error will adversely affect the correction signals that are generated for transmitter section 12. Transmitter 60 of FIG. 2 overcomes the issue by calibrating independently of a receiver section; however it can take an unacceptable amount of time to connect the spectrum analyzer and generate the known data signals.

SUMMARY

An I/Q calibration system for a quadrature amplitude modulation (QAM) mode transceiver is described. The I/Q calibration system includes a signal generator that generates reference in-phase (I) and quadrature (Q) signals, an I/Q mismatch compensation module that generates compensated I and Q signals based on the reference I and Q signals and amplitude and phase correction signals, an I/Q mismatch calibration module that generates the amplitude and phase correction signals, and a phase stepper module that varies a phase of the reference I and Q signals based on the amplitude and phase correction signals.

In other features the I/Q calibration system includes a transmit analog mixer module that generates a QAM signal based on the compensated I and Q signals and a receive analog mixer that generates received I and Q signals based on the QAM signal. The compensated I and Q signals and the received I and Q signals are related by a phase offset and wherein the phase stepper module reduces the phase offset. An analog-to-digital converter converts the received I and Q signals from analog formats to respective digital representations and the I/O mismatch calibration module generates the amplitude and phase correction signals based on the digital representations. The phase stepper module varies the phase of the reference I and Q signals when the magnitude of at least one of the amplitude and phase correction signals exceeds a predetermined magnitude. The phase stepper module varies the phase of the reference I and Q signals based on at least one of the amplitude and phase correction signals crossing zero more than a predetermined number of times.

A self-calibrating quadrature amplitude modulation (QAM) mode transceiver is disclosed. The self-calibrating QAM mode transceiver includes a transmitter that includes a generator that generates digitized in-phase (I) and quadrature (Q) signals, a compensation module that generates compensated I and Q signals based on the digitized I and Q signals and amplitude and phase correction signals, a digital-to-analog converter module that generates analog I and Q signals based on the compensated I and Q signals, and a first analog mixer module that generates a radio-frequency (RF) transmit signal based on the analog I and Q signals. A calibration module generates the amplitude and phase correction signals based on the analog I signal component of the RF transmit signal. A phase stepper module varies the phase of the digitized in-phase (I) and quadrature (Q) signals based on the amplitude and phase correction signals.

In other features the transceiver includes a receiver. The receiver includes a second analog mixer module that generates an I component signal based on the RF transmit signal. The I component signal includes an analog Q crosstalk signal. The I component signal and the analog Q crosstalk signal are related to the analog I and Q signals by a phase offset. An analog-to-digital converter (ADC) converts the I component signal to a digitized I component signal and a digital mixer generates a reconstructed digitized I signal and a digitized Q crosstalk signal based on the digitized I component signal. The calibration module generates the amplitude and phase correction signals based on the reconstructed digitized I signal and the digitized Q crosstalk signal. The phase stepper module varies the phase of the digitized I and Q signals based on the amplitude and phase correction signals and thereby varies the phase offset.

In other features the phase stepper module varies the phase of the digitized I and Q signals by a predetermined amount. The second analog mixer module further generates a Q component signal based on the RF transmit signal. The receiver includes a band-pass filter (BPF) positioned between the second analog mixer module and the ADC. The transceiver includes a switch that selectively routes the I component signal around the BPF.

An I/Q calibration system for a quadrature amplitude modulation (QAM) mode transceiver includes signal generator means for generating reference in-phase (I) and quadrature (Q) signals, I/Q mismatch compensation means for generating compensated I and Q signals based on the reference I and Q signals and amplitude and phase correction signals, I/Q mismatch calibration means for generating the amplitude and phase correction signals, and phase stepper means for varying a phase of the reference I and Q signals based on the amplitude and phase correction signals.

In other features the I/Q calibration system includes transmit analog mixer means for generating a QAM signal based on the compensated I and Q signals and receive analog mixer means for generating received I and Q signals based on the QAM signal. The compensated I and Q signals and the received I and Q signals are related by a phase offset. The phase stepper means reduces the phase offset. The I/Q calibration system includes analog-to-digital converter means for converting the received I and Q signals from analog formats to respective digital representations and the I/Q mismatch calibration means generates the amplitude and phase correction signals based on the digital representations. The phase stepper means varies the phase of the reference I and Q signals when the magnitude of at least one of the amplitude and phase correction signals exceeds a predetermined magnitude. The phase stepper means varies the phase of the reference I and Q signals based on at least one of the amplitude and phase correction signals crossing zero more than a predetermined number of times.

A self-calibrating quadrature amplitude modulation (QAM) mode transceiver includes a transmitter. The transmitter includes generator means for generating digitized in-phase (I) and quadrature (Q) signals, compensation means for generating compensated I and Q signals based on the digitized I and Q signals and amplitude and phase correction signals, digital-to-analog converter means for generating analog I and Q signals based on the compensated I and Q signals; and first analog mixer means for generating a radio-frequency (RF) transmit signal based on the analog I and Q signals. Calibration means generate the amplitude and phase correction signals based on the analog I signal component of the RF transmit signal and phase stepper means vary the phase of the digitized in-phase (I) and quadrature (Q) signals based on the amplitude and phase correction signals.

In other features the transceiver includes a receiver comprising second analog mixer means for generating an I component signal based on the RF transmit signal. The I component signal includes an analog Q crosstalk signal. The I component signal and the Q crosstalk signal are related to the analog I and Q signals by a phase offset. The receiver includes analog-to-digital converter (ADC) means for converting the I component signal to a digitized I component signal and digital mixer means for generating a reconstructed digitized I signal and a digitized Q crosstalk signal based on the digitized I component signal. The calibration means generates the amplitude and phase correction signals based on the reconstructed digitized I signal and the digitized Q crosstalk signal. The phase stepper means varies the phase of the digitized I and Q signals based on the amplitude and phase correction signals and thereby varies the phase offset.

In other features the phase stepper means varies the phase of the digitized I and Q signals by a predetermined amount. The second analog mixer means further generates a Q component signal based on the RF transmit signal. The receiver further comprises band-pass filter (BPF) means positioned between the second analog mixer module and the ADC. The transceiver includes switch means for selectively routing the I component signal around the BPF.

A method of calibrating a quadrature amplitude modulation (QAM) mode transceiver includes generating reference in-phase (I) and quadrature (Q) signals, generating compensated I and Q signals based on the reference I and Q signals and amplitude and phase correction signals, generating the amplitude and phase correction signals, and varying a phase of the reference I and Q signals based on the amplitude and phase correction signals.

In other features the method includes generating a QAM signal based on the compensated I and Q signals and generating received I and Q signals based on the QAM signal. The compensated I and Q signals and the received I and Q signals are related by a phase offset. Varying the phase of the reference I and Q signals reduces the phase offset. The method includes converting the received I and Q signals from analog formats to respective digital representations and generating the amplitude and phase correction signals based on the digital representations. The method includes varying the phase of the reference I and Q signals when the magnitude of at least one of the amplitude and phase correction signals exceeds a predetermined magnitude. The method includes varying the phase of the reference I and Q signals based on at least one of the amplitude and phase correction signals crossing zero more than a predetermined number of times.

A method of calibrating a quadrature amplitude modulation (QAM) mode transceiver includes generating digitized in-phase (I) and quadrature (Q) signals, generating compensated I and Q signals based on the digitized I and Q signals and amplitude and phase correction signals, generating analog I and Q signals based on the compensated I and Q signals, generating a radio-frequency (RF) transmit signal based on the analog I and Q signals, generating the amplitude and phase correction signals based on the analog I signal component of the RF transmit signal, and varying the phase of the digitized in-phase (I) and quadrature (Q) signals based on the amplitude and phase correction signals.

In other features the method includes generating an I component signal based on the RF transmit signal. The I component signal includes an analog Q crosstalk signal. The I component signal and the Q crosstalk signal are related to the analog I and Q signals by a phase offset. The method includes converting the I component signal to a digitized I component signal and generating a reconstructed digitized I signal and a digitized Q crosstalk signal based on the digitized I component signal. The method includes generating the amplitude and phase correction signals based on the reconstructed digitized I signal and the digitized Q crosstalk signal and varying the phase of the digitized I and Q signals based on the amplitude and phase correction signals and thereby varying the phase offset. The phase of the digitized I and Q signals is varied by a predetermined amount. The method includes generating a Q component signal based on the RF transmit signal. The method includes band-pass filtering (BPF) the I-component signal and selectively routing the I component signal around the BPF.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
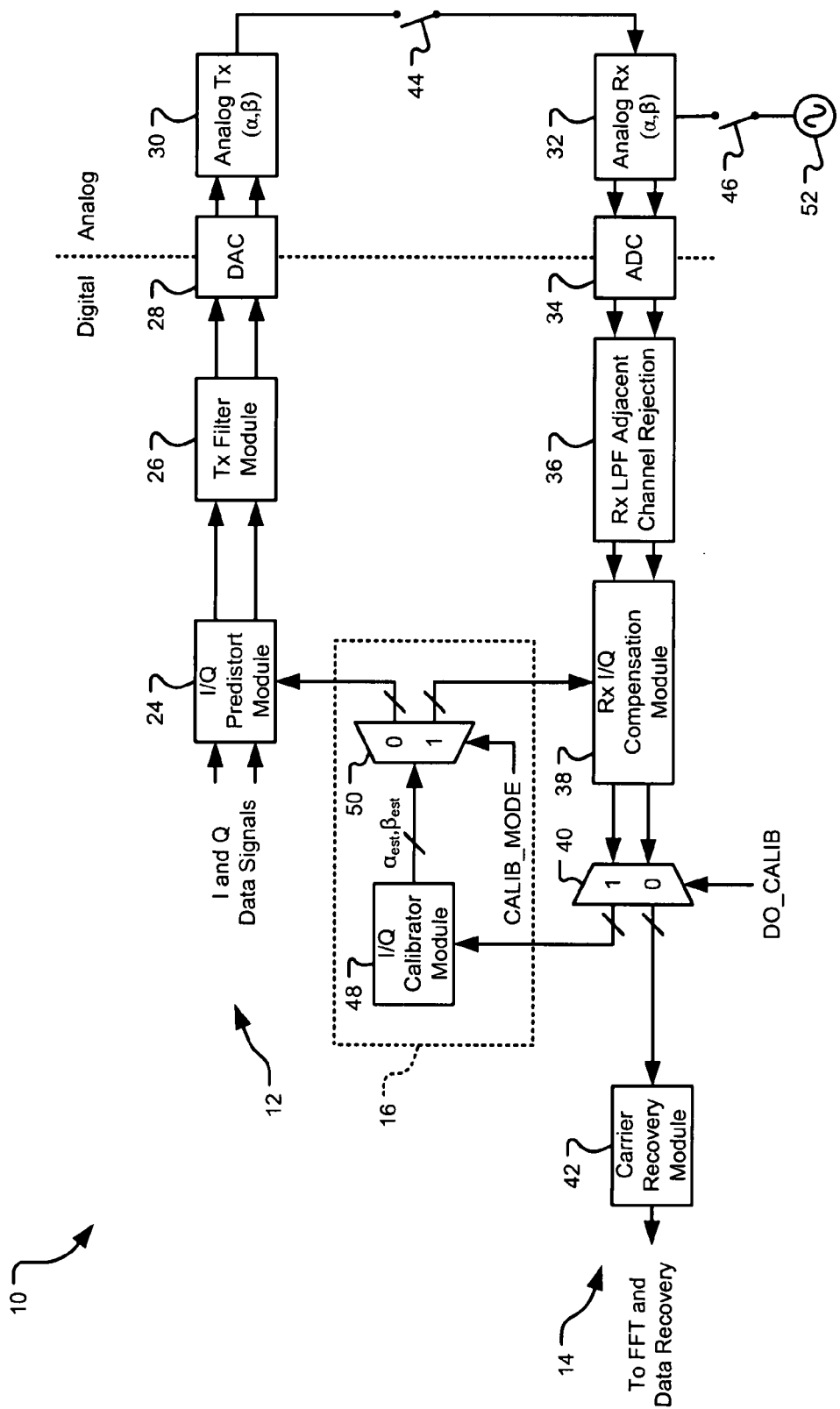
FIG. 1 is a functional block diagram of a self-calibrating I/O mismatch compensated transceiver according to the prior art.
Figure 2:
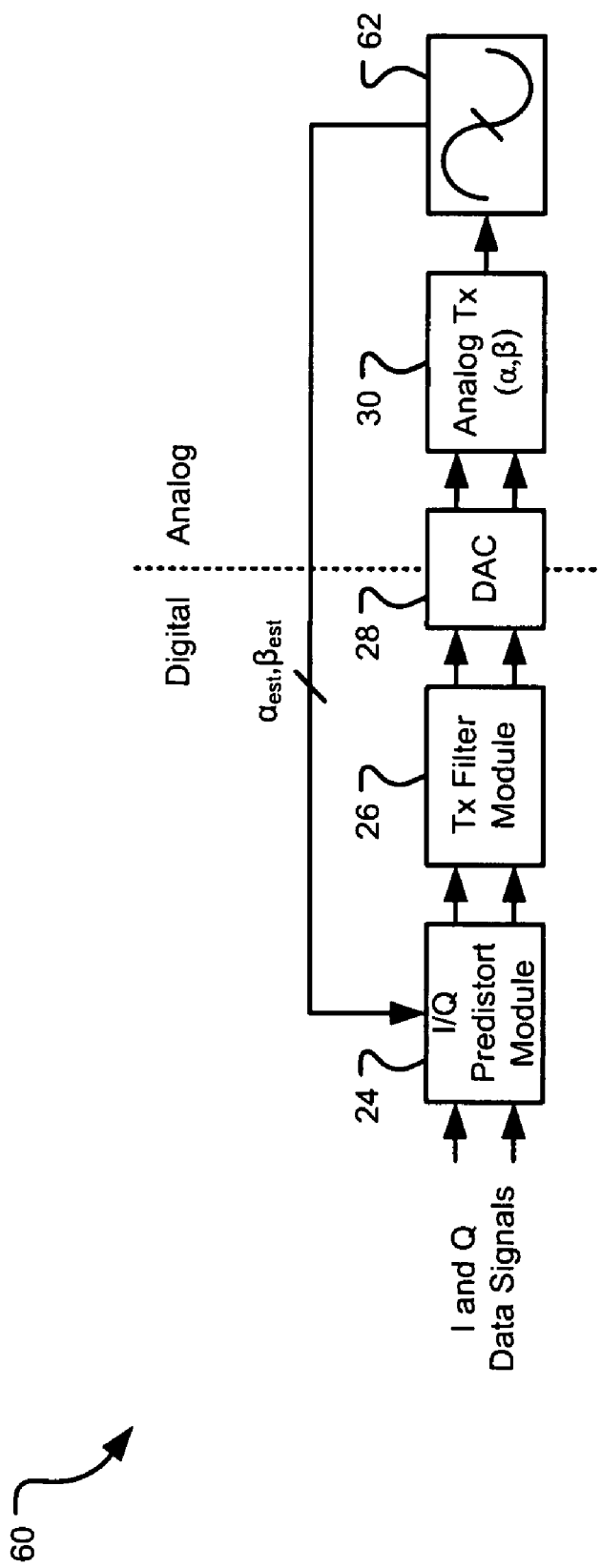
FIG. 2 is a functional block diagram of an I/Q mismatch-compensated transmitter according to the prior art.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 3:
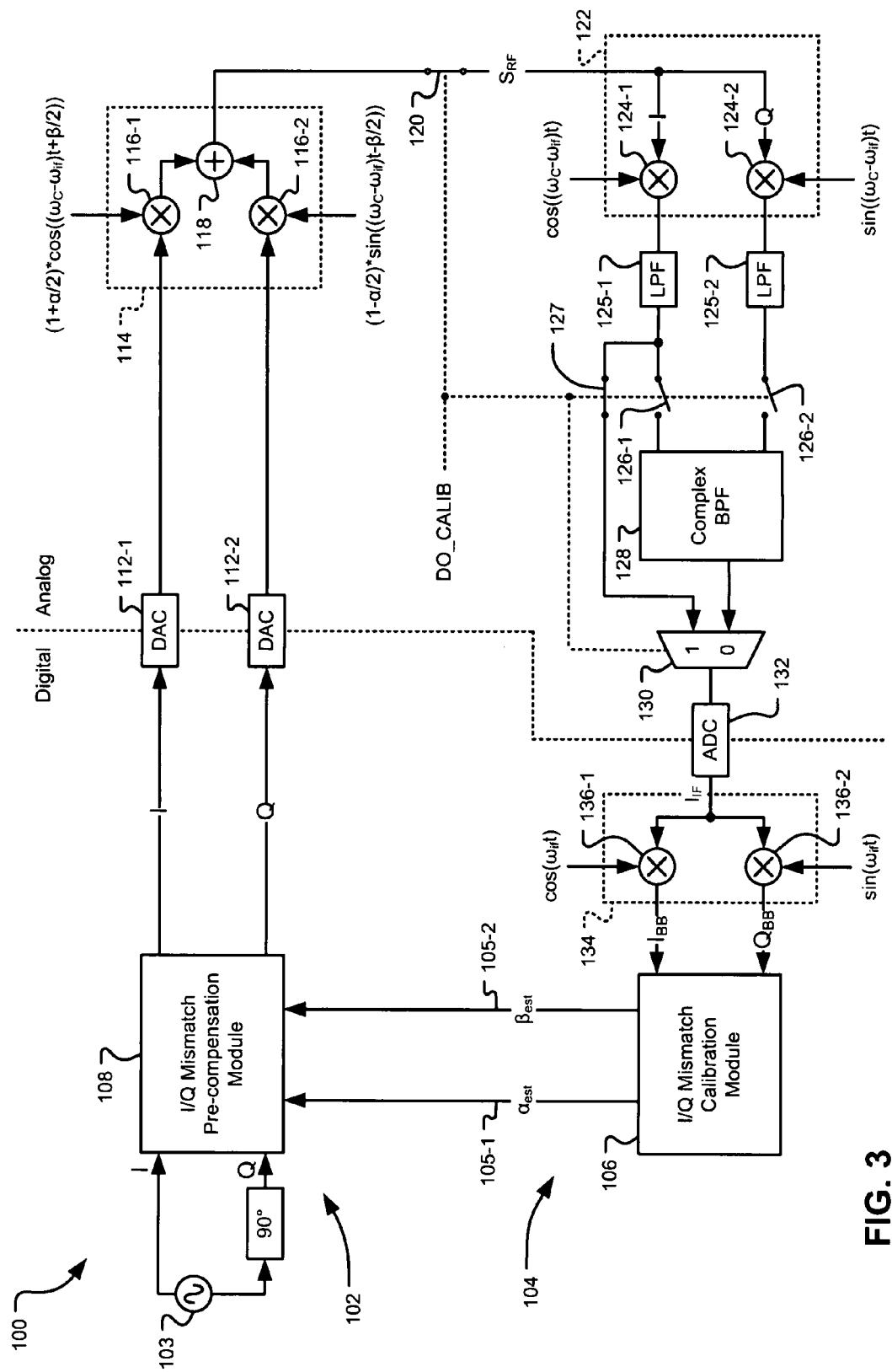
FIG. 3 is a functional block diagram of an improved self-calibrating I/O mismatch compensated transceiver.

Referring now to FIG. 3, a functional block diagram is shown of an I/Q-mismatch compensated transceiver 100. Transceiver 100 can be implemented as a system-on-chip (SOC). Transceiver 100 includes a transmitter section 102 and a receiver section 104. Receiver section 104 includes an I/Q mismatch calibration module (I/Q-MCM) 106 that generates an amplitude correction signal $\alpha_{est}$ 105-1 and a phase correction signal $\beta_{est}$ 105-2, collectively referred to as correction signals 105. I/Q-MCM 106 generates correction signals 105 based on one of I and Q signals in receiver section 104. I/Q-MCM 106 therefore enables transmitter section 102 to self-calibrate for I/Q mismatch regardless of whether receiver section 104 is I/Q mismatched.

Transmitter section 102 includes an I/Q mismatch precompensation module 108 that compensates in-phase (I) and quadrature (Q) signals based on correction signals 105. During a calibration mode, which is described below, a reference signal generator 103 generates digitized I and Q signals. DACs 112 convert the digitized I and Q signals to respective analog I and Q signals.

An analog transmit mixer module 114 includes a first analog mixer 116-1 and a second analog mixer 116-2. First analog mixer 116-1 generates an I component of the modulated RF carrier by mixing the analog I signal with a signal based on the equation $\cos((\omega_c-\omega_{if})t)$, where $\omega_c$ represents the period of the RF carrier, $\omega_{if}$ represent the period of the IF, and t represents time. Second analog mixer 116-2 generates a Q component of the modulated RF carrier by mixing the analog Q signal with a signal based on the equation $\sin((\omega_c-\omega_{if})t)$.

Each analog mixer 116 may have unity gain for amplitude and phase. However, due to variables in material and manufacturing, each analog mixer 116 may have slightly different amplitude and phase gains. These different amplitude and phase gains generate an undesirable amplitude difference $\alpha$ and/or an undesirable phase error $\beta$ between the I and Q components. The amplitude mismatch $\alpha$ and the phase mismatch $\beta$ can be modeled in the mixing signals. The mixing signal for analog mixer 116-1 then becomes $$(1+\alpha/2)\cos((\omega_c-\omega_{if})t)+\beta/2) \qquad \text{Eq. 1}$$

and the mixing signal for analog mixer 116-2 becomes $$(1-\alpha/2)\sin((\omega_c-\omega_{if})t)-\beta/2) \qquad \text{Eq. 2}$$

Eq. 1 is multiplied by the analog I signal to obtain the I component of the RF carrier. Likewise, Eq. 2 is multiplied by the analog Q signal to obtain the Q component of the RF carrier. It can be seen from Eqs. 1 and 2 that the I and Q components each include information regarding the amplitude mismatch $\alpha$ and the phase mismatch $\beta$. I/Q-MCM 106 uses the information to generate the correction signals 105 based on equations that are described below.

Analog transmit mixer module 114 includes an adder 118 that generates the RF carrier based on the I and Q components. During I/Q mismatch calibration the RF carrier can be looped back, via a loopback switch 120, to an input of receiver section 104. Loop back switch 120 can be implemented with a transistor and controlled via a control signal DO_CALIB.

Receiver section 104 includes an analog receive mixer module 122 that receives the looped-back RF carrier. Analog receive mixer module 122 includes a pair of analog mixers 124-1 and 124-2 that each receive the RF carrier. Analog mixer 124-1 reproduces the I component at the IF by mixing the RF carrier with a signal based on the equation $\cos((\omega_c-\omega_{if})t)$. Analog mixer 124-2 reproduces the Q component at the IF by mixing the RF carrier with a signal based on the equation $\sin((\omega_c-\omega_{if})t)$.

During normal operation the reproduced I and Q components communicate through respective low-pass filters 125 and switches 126 to respective inputs of a complex bandpass filter (BPF) 128. However, during the calibration mode, the control signal DO_CALIB opens switches 126 and closes switch 127. Switches 126 and 127 can be implemented with transistors. Switch 127 selectively connects one of the reproduced I and Q components to an input of a multiplexer 130, bypassing complex BPF 128. While FIG. 3 shows one end of switch 127 being connected to the output of analog mixer 124-1 it should be appreciated that the connection can be moved to the output of second mixer 124-2 without adversely affecting the operation of transceiver 100.

During the calibration mode multiplexer 130 routes the second end of switch 127 to an input of an ADC 132. ADC 132 converts the reproduced I component to a reproduced digital I signal. The reproduced digital I signal is communicated to a digital mixer 134 that downconverts the reproduced digital I signal from the IF to the baseband frequency.

Digital mixer 134 includes first and second mixers 136-1, 136-2 that mix the reproduced digital I signal with signals based on the equations $\cos(\omega_{if}t)$ and $\sin(\omega_{if}t)$, respectively. The output of first mixer 136-1 includes a reproduction of the component I signal. The output of second mixer 136-2 includes a portion of the compensated Q signal. The Q-signal portion, or crosstalk portion, entered the I component of the RF carrier due to the I/Q mismatch in analog transmit mixer module 114. The reproduced digital I signal and the crosstalk portion are applied to respective inputs of I/Q-MCM 106. I/Q-MCM 106 then estimates the amplitude mismatch $\alpha$ and the phase mismatch $\beta$ and generates corresponding correction signals 105.

I/Q-MCM 106 can employ equations that are included in the following mathematical derivation. The derivation provides a solution for estimating the amplitude mismatch $\alpha$ and the phase mismatch $\beta$ based on the reproduced digital I signal and the crosstalk portion.

The RF carrier signal that is received by analog receive mixer module 122 can be described by the equation:

$$S_{RF}=(1+\alpha/2)\,I\cos(\omega_c t+\beta/2)+(1-\alpha/2)\,Q\sin(\omega_c t-\beta/2) \qquad \text{Eq. 3}$$

The reproduced I component at the output of analog mixer 124-1 can then be described by the equation:

$$I_{IF} = I[\cos((2\omega_c+\omega_{if})t)+\cos(\omega_c t)] + Q[\sin((2\omega_c-\omega_{if})t)+\sin(\omega_{if}t)] \quad \text{Eq. 4}$$

LPFs 125 diminish signals at frequencies above the IF and the reproduced I component at the output of LPF 125-1 can then be described by the simplified equation:

$$I_{IF} = (S_{RF})\cos((\omega_c - \omega_{if})t) \quad \text{Eq. 5}$$

$$= (1+\alpha/2)I\cos(\omega_{if}t + \beta/2) + (1-\alpha/2)Q\sin(\omega_{if}t - \beta/2) \quad \text{Eq. 6}$$

The reproduced digital I signal at the output of first mixer 136-1 can be described by the equation:

$$I_{BB} = (I_{IF})\cos(\omega_{if}t) \quad \text{Eq. 7}$$

$$= (1+\alpha/2)I\cos(\beta/2) - (1-\alpha/2)Q\sin(\beta/2) \quad \text{Eq. 8}$$

The crosstalk portion at the output of second mixer 136-2 can be described by the equation:

$$Q_{BB} = (1+\alpha/2)I\sin(\beta/2) - (1-\alpha/2)Q\cos(\beta/2) \quad \text{Eq. 9}$$

Eq. 9 assumes that signal components at $2\omega_{if}$ are removed by LPF 125-1.

$I_{BB}$ and $Q_{BB}$ are communicated to respective inputs of I/Q-MCM 106, which estimates $\int(I_{BB}^2 - Q_{BB}^2)$ and $\int I_{BB} \times Q_{BB}$. Using Eq. 8 and Eq. 9, $$I_{BB}^2 - Q_{BB}^2 = (1+\alpha/2)^2 I^2 \cos^2(\beta/2) + (1-\alpha/2)^2 Q^2 \sin^2(\beta/2) -$$
$$2(1-\alpha^2/4)IQ\sin\beta/2 - [(1+\alpha/2)^2 I^2 \sin^2(\beta/2) +$$
$$(1-\alpha/2)^2 Q^2 \cos^2(\beta/2) - 2(1-\alpha^2/4)IQ\sin\beta/2]$$
$$= (1+\alpha/2)^2 I^2 (\cos^2(\beta/2) - \sin^2(\beta/2)) - (1-\alpha/2)^2 Q^2 (\cos^2(\beta/2) - \sin^2(\beta/2))$$
$$= [I^2 + \alpha I^2 + \alpha^2/4 I^2 - Q^2 + \alpha Q^2 - \alpha^2/4 Q^2](\cos\beta)$$
$$= [(I^2 - Q^2)(1-\alpha^2/4) + \alpha(I^2 + Q^2)]\cos\beta$$

Noting that $I = \cos(\omega_{BB}t)$ and $Q = \sin(\omega_{BB}t)$, $$\int_0^T (I^2 - Q^2)dt = 0,$$

$$\int_0^T (I^2 + Q^2)dt = T, \quad \int_0^T IQ\,dt = 0.$$

It can also be assumed that $\beta$ is small. Hence $\cos\beta = 1$ and $\alpha \ll 1$. Hence $\alpha^2/4 \approx 0$. Thus $$\int_0^T (I_{BB}^2 - Q_{BB}^2)dt = T\alpha = \text{constant} \times \alpha \quad \text{Eq. 10}$$

Now considering $\int_0^T I_{BB}Q_{BB}\,dt$, $$I_{BB}Q_{BB} = (1+\alpha/2)^2 I^2 \sin\beta/2 + (1-\alpha/2)^2 Q^2 \sin\beta/2 -$$
$$(1-\alpha^2/4)I/Q(\cos^2(\beta/2) + \sin^2(\beta/2))$$
$$= \sin\beta/2[I^2 + \alpha I^2 \alpha^2 I^2/4 + Q^2 - \alpha Q^2 \alpha^2 Q^2/4] -$$
$$(1-\alpha^2/4)I/Q$$

From the above assumption that $\beta$ is small, $$\int_0^T I_{BB}Q_{BB}\,dt = T\beta = \text{constant} \times \beta. \quad \text{Eq. 11}$$

I/Q-MCM 106 can therefore employ Eq. 10 and Eq. 11 to estimate the amplitude mismatch $\alpha$ and the phase mismatch $\beta$ respectively and generate corresponding correction signals 105.

Figure 4:
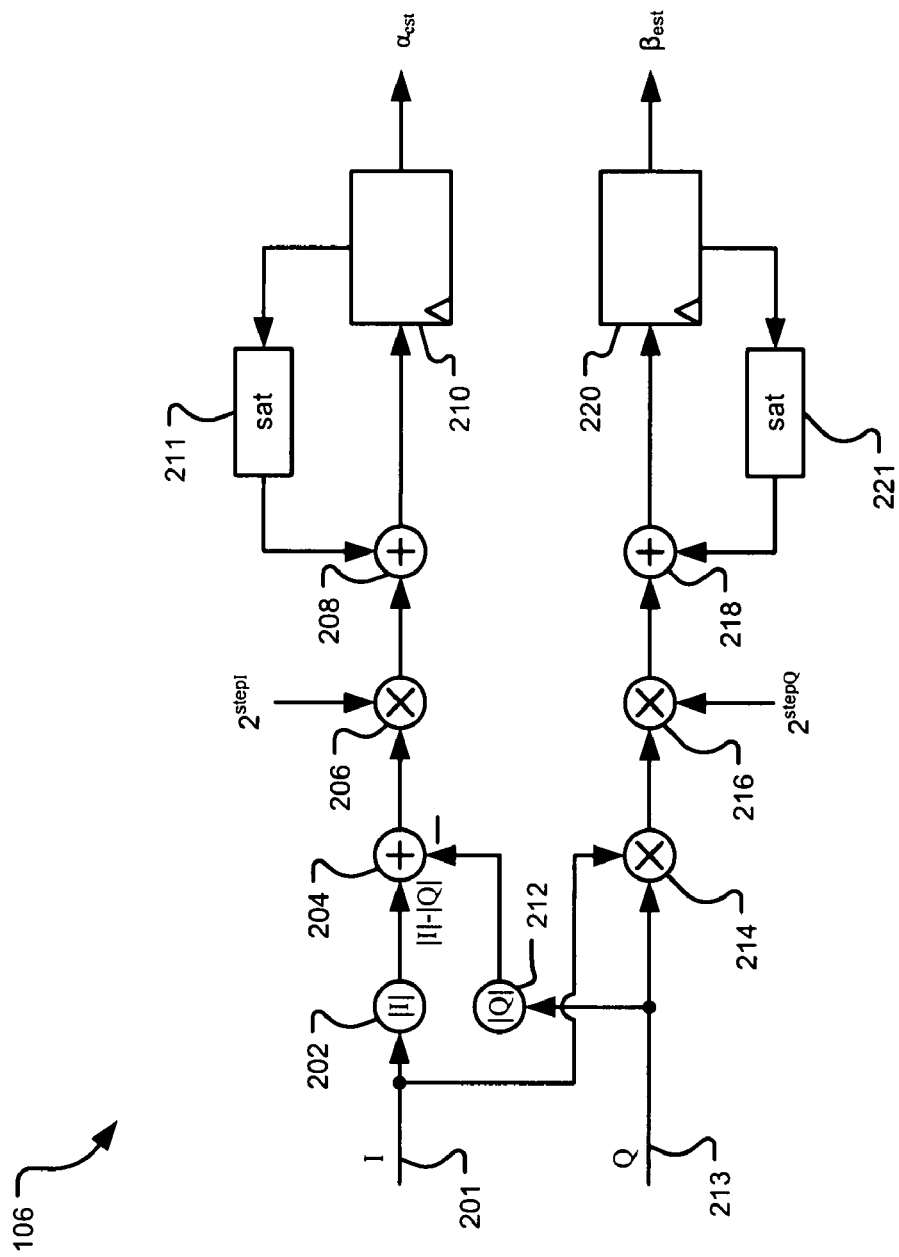
FIG. 4 is a system diagram of an I/O calibration module for the transceiver of FIG. 3.

Referring now to FIG. 4, a functional block diagram is shown of I/Q-MCM 106. A first input 201 receives the reproduced digital I signal and communicates with an input of a first absolute value module 202. An output of first absolute value module 202 communicates with an input of a summation module 204. An output of summation module 204 communicates with an input of a scaling module 206. Scaling module 206 provides a gain of $2^{stepI}$, where stepI is an integer less than or equal to zero. An output of scaling module 206 communicates with an input of a summation module 208. Summation module 208 communicates instantaneous estimates of the amplitude mismatch a to a buffer 210. Buffer 210 generates $\alpha_{est}$ 105-1 and communicates $\alpha_{est}$ 105-1 to an output and to an input of a saturation filter 211. $\alpha_{est}$ 105-1 is a signed binary integer and saturation filter 211 prevents $\alpha_{est}$ 105-1 from rolling over after it saturates. An output of saturation filter 211 communicates with a second input of summation module 208.

A second input 213 receives the crosstalk portion and communicates with an input of a second absolute value module 212 and an input of a multiplication module 214. An output of second absolute value module 212 communicates with a second input of summation module 204. First input 201 communicates with a second input of multiplication module 214. An output of multiplication module 214 communicates with an input of a scaling module 216. Scaling module 216 provides a gain of $2^{stepQ}$, where stepQ is an integer less than or equal to zero. An output of scaling module 216 communicates with an input of a summation module 218. Summation module 218 communicates instantaneous values of the phase mismatch 13 to a buffer 220. Buffer 220 generates $\beta_{est}$ 105-2 and communicates $\beta_{est}$ 105-2 to an output and to an input of a saturation filter 221. $\beta_{est}$ 105-2 is a signed binary integer and saturation filter 221 prevents $\beta_{est}$ 105-2 from rolling over after it saturates. An output of saturation filter 221 communicates with a second input of summation module 218.

Figure 5:
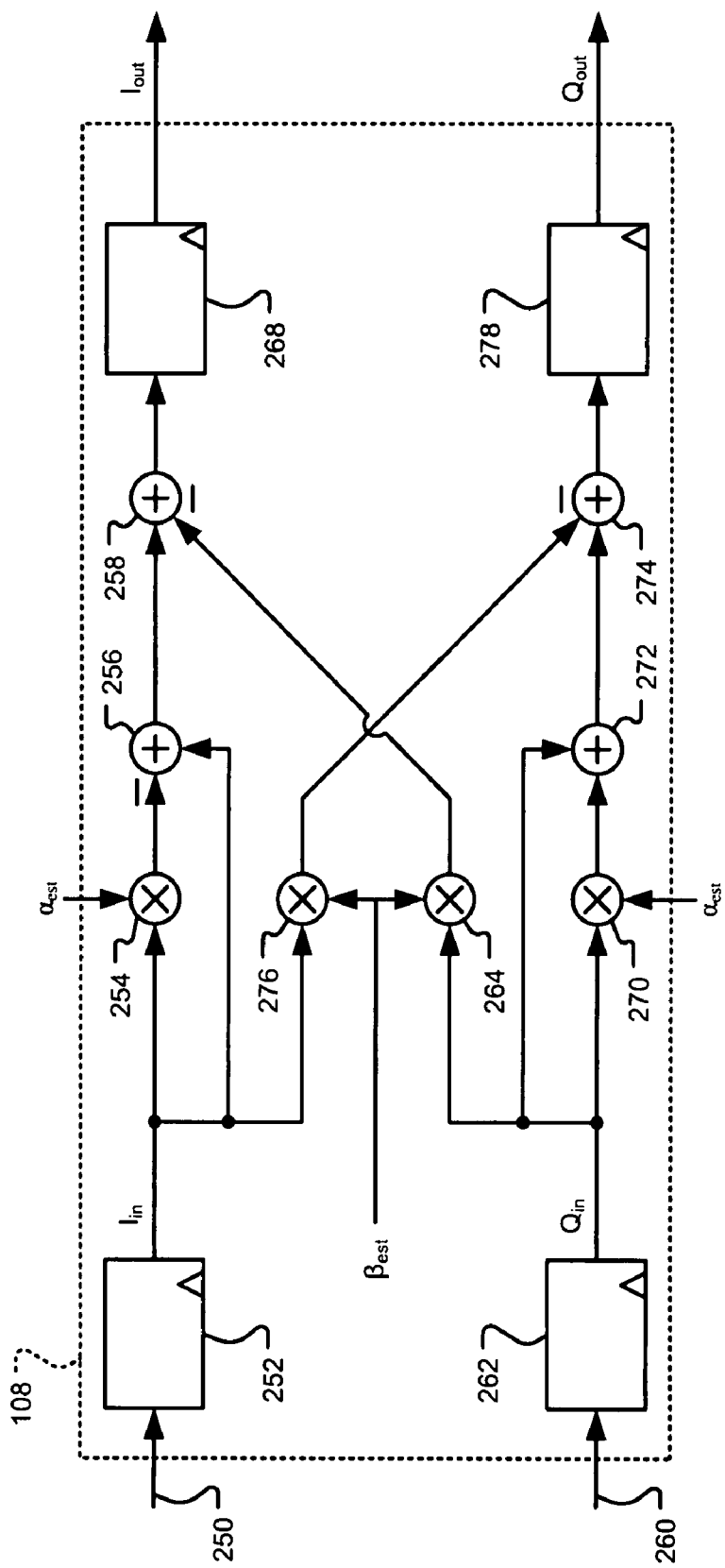
FIG. 5 is a system diagram of a prior art I/Q precompensation module that can be used with the transceiver of FIG. 3.

Referring now to FIG. 5, a functional block diagram is shown of an I/Q mismatch precompensation module 108. It should be appreciated that other implementations may also be used. A first input 250 receives the ideal I signal. A buffer 252 buffers the ideal I signal and communicates it to an input of a multiplication module (global) 254. Multiplication module 254 also receives $\alpha_{est}$ 105-1. An output of multiplication module 254 communicates with an inverting input of a summation module 256. A second input of summation module 256 receives the ideal I signal from the output of buffer 252. An output of summation module 256 communicates with an input of a summation module 258. A second input 260 receives the ideal Q signal. A buffer 262 buffers the ideal Q signal and communicates it to an input of a multiplication module 264. A second input of multiplication module 264 receives $\beta_{est}$ 105-2. An output of multiplication module 264 communicates with an inverting input of summation module 258. An output of summation module 258 communicates instantaneous values of the compensated I signal to a buffer 268. An output of buffer 268 generates the compensated I signal.

An input of multiplication module 270 receives the ideal Q signal from the output of buffer 262. A second input of multiplication module 270 receives $\alpha_{est}$ 105-1. An output of multiplication module 270 communicates with an input of a summation module 272. A second input of summation module 272 receives the ideal Q signal from the output of buffer 262. An output of summation module 272 communicates with an input of a summation module 274. A multiplication module 276 receives the ideal I signal from the output of buffer 252 and receives $\beta_{est}$ 105-2. An output of multiplication module 276 communicates with an inverting input of summation module 274. An output of summation module 274 communicates instantaneous values of the compensated Q signal to an input of a buffer 278. An output of buffer 278 generates the compensated Q signal.

Figure 6:
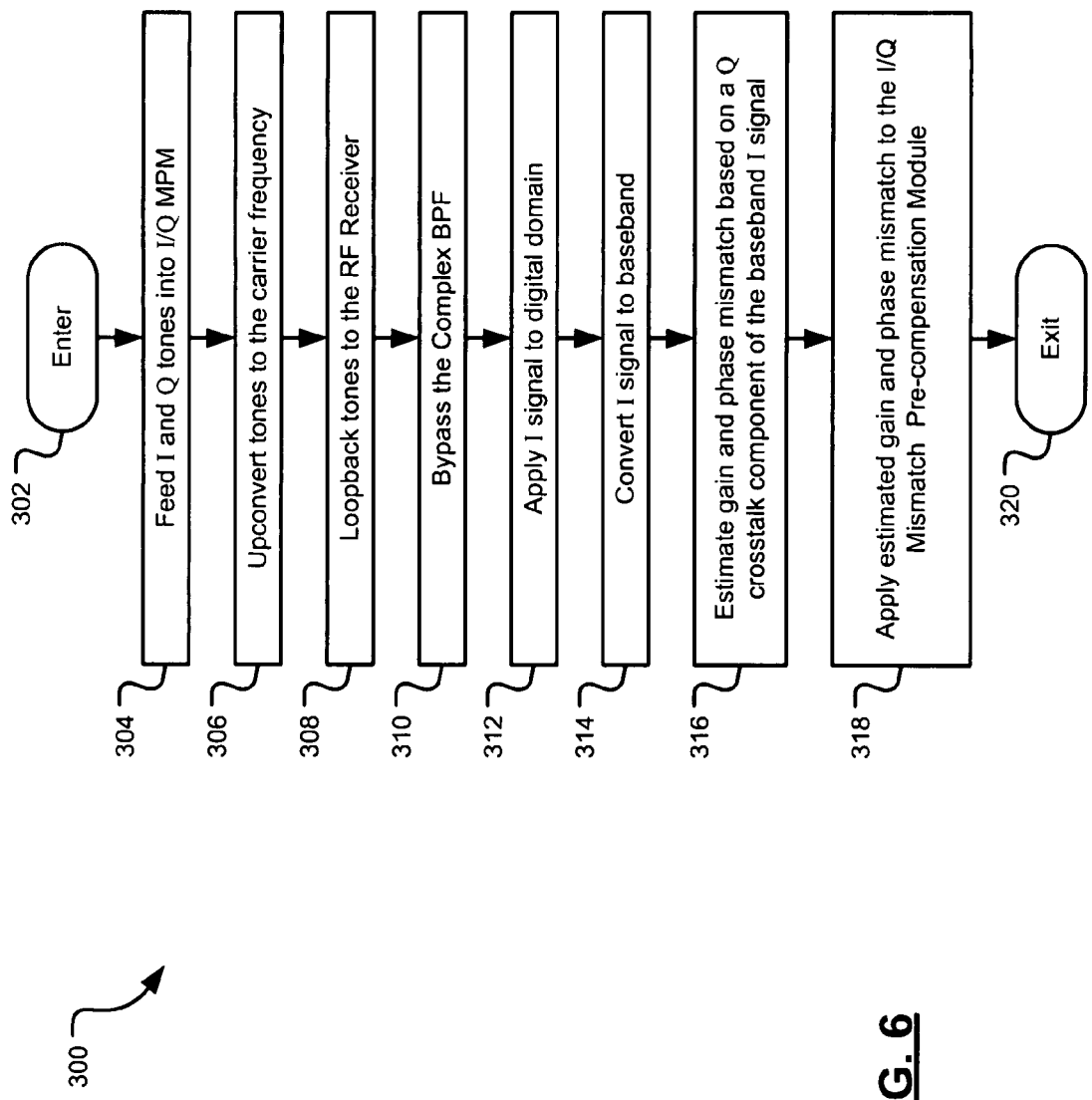
FIG. 6 is a flow chart of a calibration method for the transceiver of FIG. 3.

Referring now to FIG. 6 a method 300 of calibrating the transmitter section 102 of transceiver 100 is shown. Method 300 can be implemented as combinatorial logic and executed when transceiver 100 is turned on. Control enters through a start block 302 and proceeds to block 304. In block 304 control enables reference signal generator 103 to communicate the ideal I and Q signals to the respective inputs of I/Q mismatch precompensation module 108. Control then proceeds to block 306 and upconverts the compensated I and Q signals to the carrier frequency via analog mixers 116. Control then proceeds to block 308 and closes loopback switch 120 to route the RF carrier signal to the input of analog receive mixer module 122. Control then proceeds to block 310 and opens switches 126 and closes switch 127 to bypass the reproduced I component around complex BPF 128. Control then proceeds to block 312 and converts the reproduced I signal to the digital domain via ADC 132. Control then proceeds to block 314 and converts the reproduced I component to the baseband frequency via first digital mixer 136-1. In block 314 control also generates the crosstalk component of the reproduced I component via second digital mixer 136-2. Control then proceeds to block 316 and estimates the amplitude mismatch α and phase mismatch β based on Eqs. 10 and 11 respectively. Control then proceeds to block 318 and generates correction signals 105 based on the estimated amplitude mismatch α and the phase mismatch β. Control then pre-compensates the I and/or Q signals in transmitter section 102. Control then proceeds to other processes via exit block 320.

Figure 7:
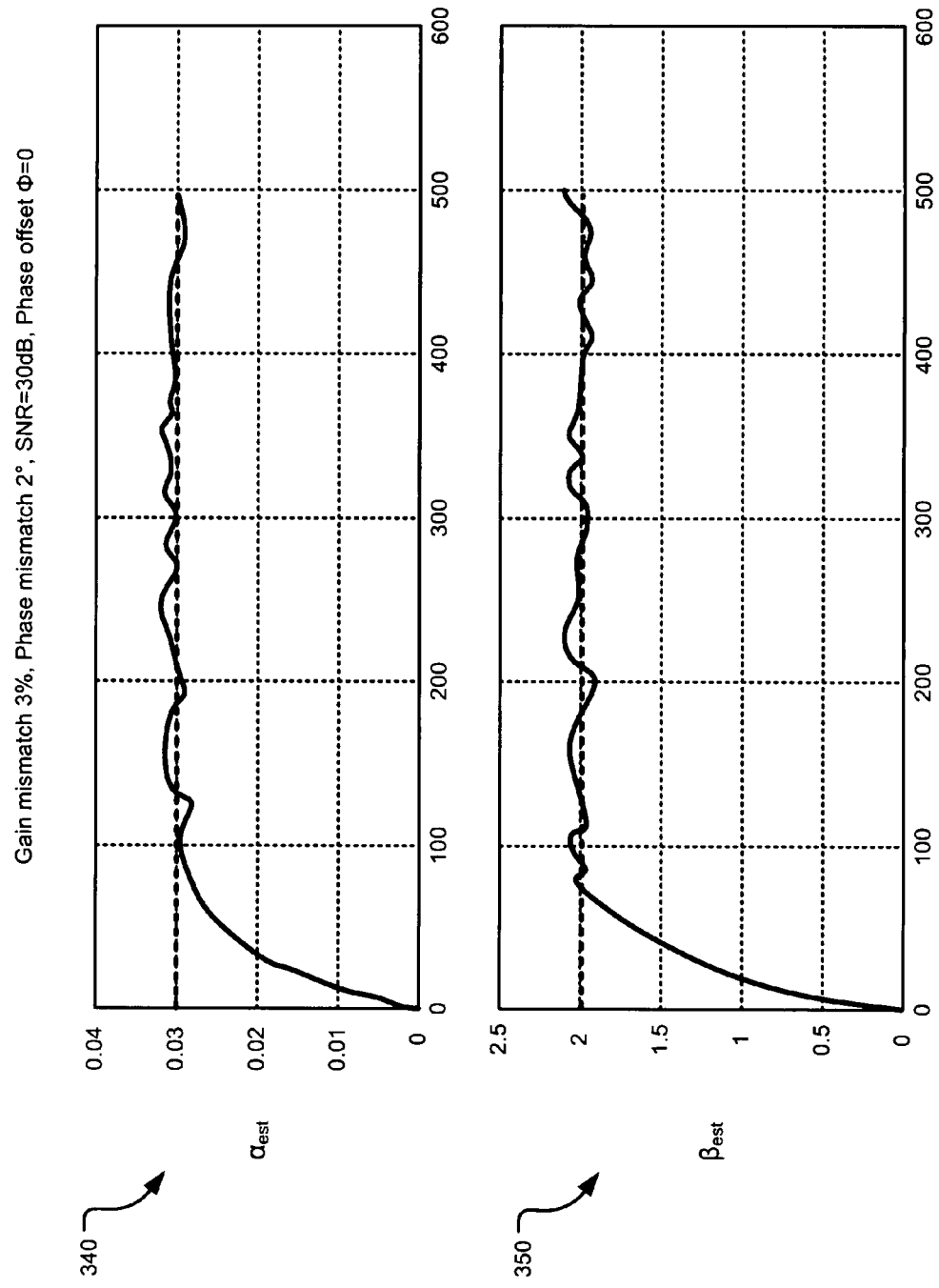
FIG. 7 is a plot of amplitude and phase estimations in the transceiver of FIG. 3.

Referring now to FIG. 7, a gain plot 340 and a phase plot 350 show respective ones of amplitude correction signal $\alpha_{est}$ 105-1 and phase correction signal $\beta_{est}$ 105-2 as the method of FIG. 6 executes. The plots are generated with a signal-to-noise ratio (SNR) of 30 dB, an I/Q phase mismatch of 2°, an I/Q gain mismatch of 3%, and no phase offset φ between analog transmit mixer module 114 and receive mixer module 122. The horizontal axis represents iteration numbers of the amplitude and phase mismatch estimates. Gain plot 340 and phase plot 350 show that the amplitude and phase estimates converge within about 100 iterations when there is no phase offset φ between analog transmit mixer module 114 and receive mixer module 122. As the phase offset φ increases it can take more iterations for the amplitude and phase mismatch estimates to converge. In some cases, such as when the phase offset φ is a multiple of 45 degrees, the amplitude and phase mismatch estimates can diverge.

Figure 8:
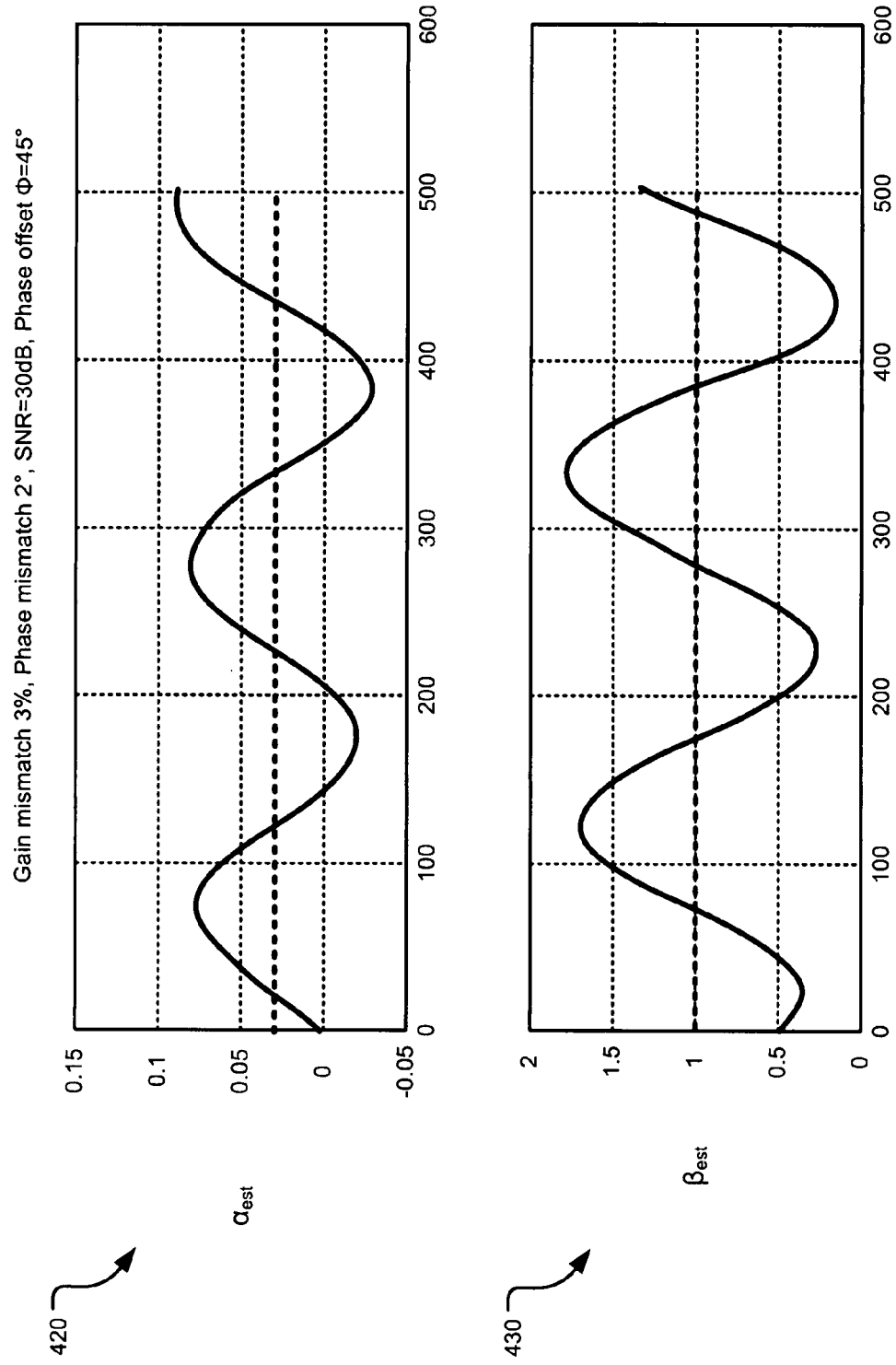
FIG. 8 is a plot of oscillating amplitude and phase estimations in the presence of a phase offset between the transmitter and receiver sections of the transceiver of FIG. 3.

Referring now to FIG. 8, a gain plot 420 and a phase plot 430 show respective ones of amplitude correction signal $\alpha_{est}$ 105-1 and phase correction signal $\beta_{est}$ 105-2 as the method of FIG. 6 executes. The plots are generated with a signal-to-noise ratio (SNR) of 30 dB, an I/Q phase mismatch of 2°, an I/Q gain mismatch of 3%, and phase offset φ=45°. The horizontal axis represents iteration numbers of the amplitude, and phase mismatch estimates. Gain plot 420 and phase plot 430 show that the amplitude and phase estimates do not converge when phase offset φ is equal to 45 degrees.

Figure 9:
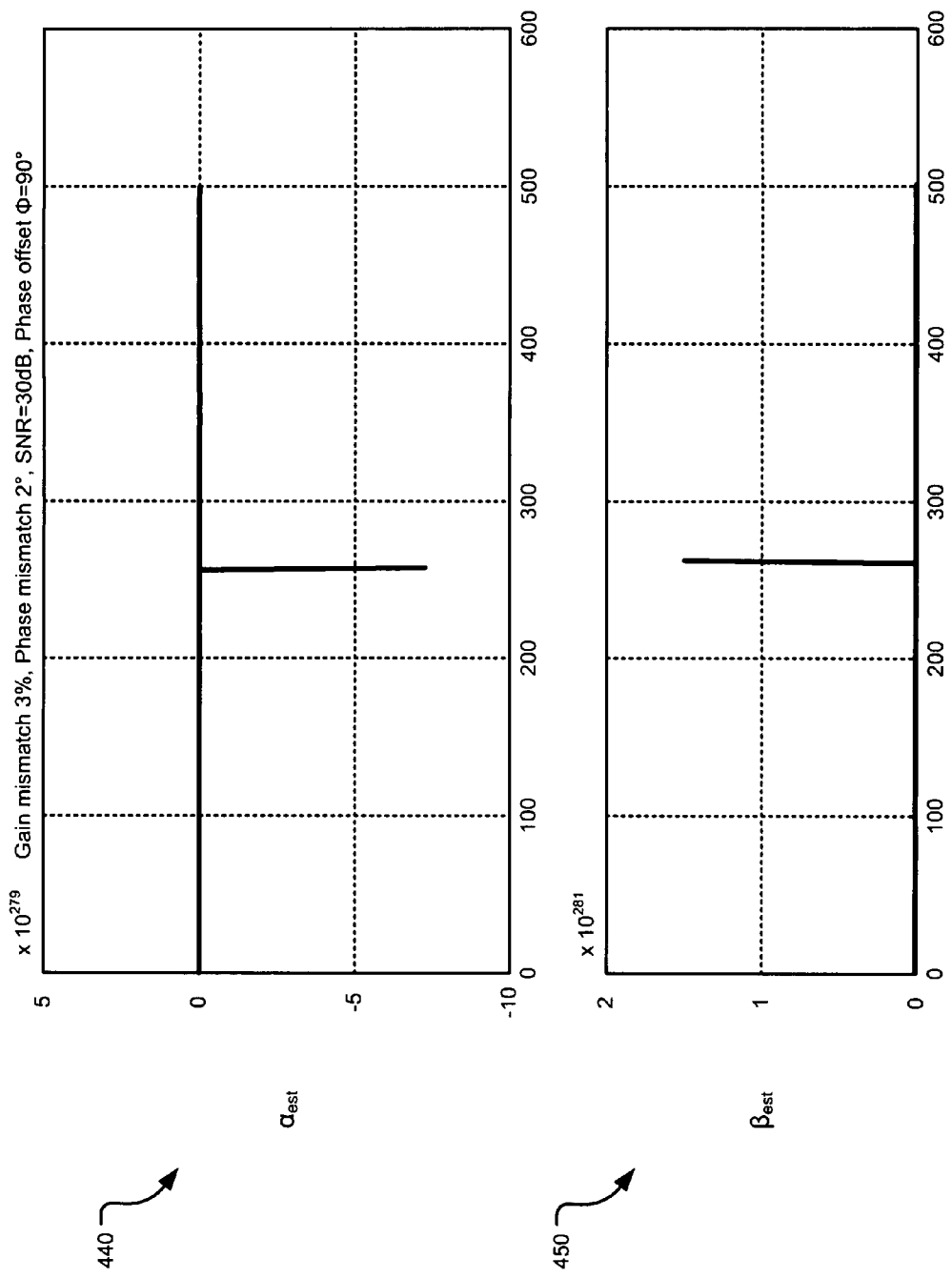
FIG. 9 is a plot of non-converging amplitude and phase estimations in the presence of a phase offset between the transmitter and receiver sections of the transceiver of FIG. 3.

Referring now to FIG. 9, a gain plot 440 and a phase plot 450 show respective ones of amplitude correction signal $\alpha_{est}$ 105-1 and phase correction signal $\beta_{est}$ 105-2 as the method of FIG. 6 executes. The plots are generated with a signal-to-noise ratio (SNR) of 30 dB, an I/Q phase mismatch of 2°, an I/Q gain mismatch of 3%, and phase offset φ=90°. The horizontal axis represents iteration numbers of the amplitude and phase mismatch estimates. Gain plot 420 and phase plot 430 show that the amplitude and phase estimates do not converge when phase offset φ is equal to 90 degrees.

Figure 10:
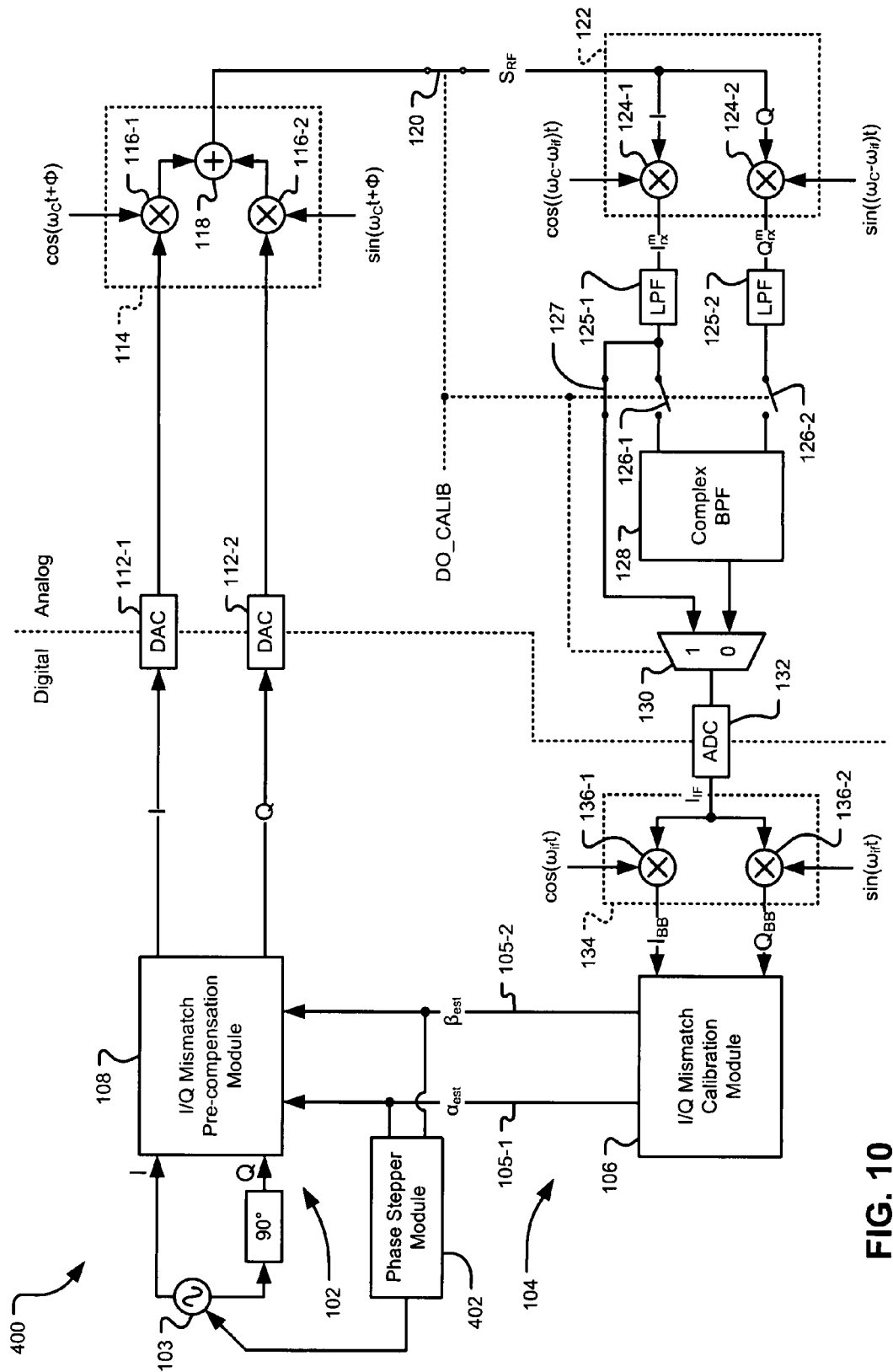
FIG. 10 is a functional block diagram of a second embodiment of a self-calibrating I/Q mismatch compensated transceiver.

Referring now to FIG. 10, a second embodiment is shown of an I/Q-mismatch compensated transceiver 400. Transceiver 400 is the same as transceiver 100 that is shown in FIG. 3, with the addition of a phase stepper module 402. Phase stepper module 402 varies the phase of reference signal generator 103 to compensate for the phase offset φ between transmit mixer module 114 and receive mixer module 122. Phase stepper module 402 varies the phase of reference signal generator 103 based on correction signals 105.

A system model of receiver 400 will now be described. The system model accounts for the phase offset φ in addition to the amplitude mismatch α and the phase mismatch β.

The imbalanced transmitted signal s(t) from analog transmit mixer module 114 can be represented by the equation $$s(t) = \left(1 + \frac{\alpha}{2}\right) I \cos\left(\omega_c t + \frac{\beta}{2}\right) - \left(1 - \frac{\alpha}{2}\right) Q \sin\left(\omega_c t - \frac{\beta}{2}\right). \quad \text{Eq. 12}$$

The received signals at the outputs of receive mixer module 122 can be represented by the equations $$I_{rx}^m = I_{rx} \cos(\phi) + Q_{rx} \sin(\phi) \quad \text{Eq. 13}$$

and $$Q_{rx}^m = Q_{rx} \cos(\phi) - I_{rx} \sin(\phi), \quad \text{Eq. 14}$$

where $I_{rx}$ and $Q_{rx}$ are defined as $$I_{rx} = \left(1 + \frac{\alpha}{2}\right) I \cos\left(\frac{\beta}{2}\right) + \left(1 - \frac{\alpha}{2}\right) Q \sin\left(\frac{\beta}{2}\right) \text{ and}$$

$$Q_{rx} = \left(1 - \frac{\alpha}{2}\right) Q \cos\left(\frac{\beta}{2}\right) + \left(1 + \frac{\alpha}{2}\right) I \sin\left(\frac{\beta}{2}\right).$$

I/Q-MCM 106 adaptively estimates values of amplitude mismatch $\alpha_n$ and the phase mismatch $\beta_n$ based on the equations $$\alpha_n = \alpha_{n-1} + \sum_{i=0}^{L-1}((I_{rx}^m)^2 - (Q_{rx}^m)^2) \quad \text{Eq. 15}$$

$$= \alpha_{n-1} + \cos(2\phi)\sum_{i=0}^{L-1}(I_{rx}^2 - Q_{rx}^2) +$$

$$2\sin(2\phi)\sum_{i=0}^{L-1}(I_{rx} \cdot Q_{rx}) \text{ and}$$

$$\beta_n = \beta_{n-1} + \sum_{i=0}^{L-1}(I_{rx}^m \cdot Q_{rx}^m) \quad \text{Eq. 16.}$$

$$= \beta_{n-1} + \cos(2\phi)\sum_{i=0}^{L-1}(I_{rx} \cdot Q_{rx}) -$$

$$\frac{\sin(2\phi)}{2}\sum_{i=0}^{L-1}(I_{rx}^2 - Q_{rx}^2),$$

where the single-tone signal from reference signal generator 103 includes L samples in the digital domain and a period Ts. Eqs. 15 and 16 show that the phase offset φ affects the amplitude mismatch estimates $\alpha_n$ and the phase mismatch estimates $\beta_n$. A method that is described below employs phase stepper module 402 to eliminate the effects of phase offset φ on the amplitude mismatch estimates $\alpha_n$ and the phase mismatch estimates $\beta_n$.

Figure 11:
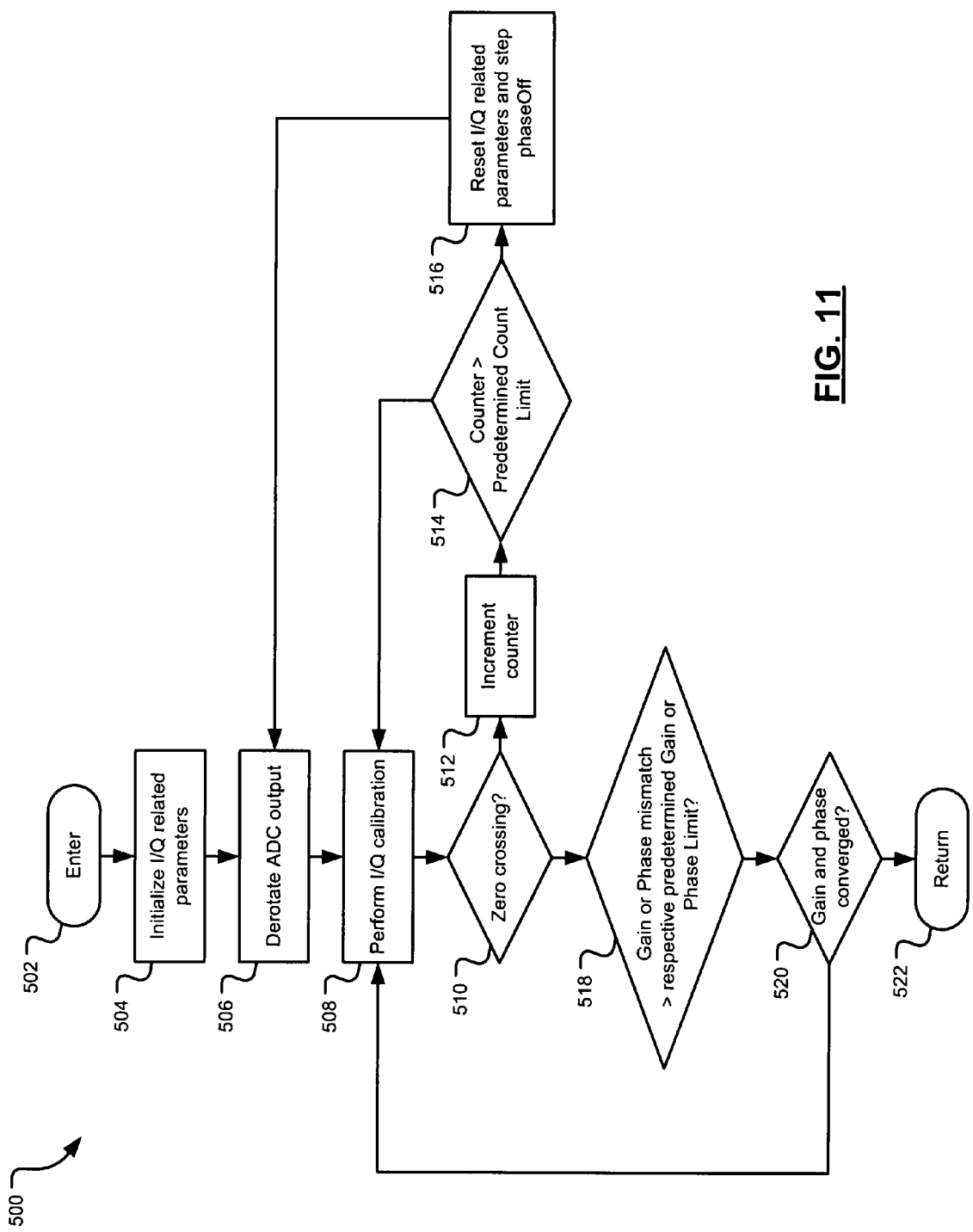
FIG. 11 is a flowchart of a method for calibrating I/Q mismatch in the transceiver of FIG. 10.

Referring now to FIG. 11, a method 500 is shown for operating performing the I/Q calibration and operating phase stepper module 402. Method 500 can be implemented as combinatorial and/or state-dependent logic and executed when transceiver 100 is turned on. Control enters through block 502 and immediately proceeds block 504 to initialize I/Q related parameters. Control then proceeds to block 506 and derotates the output of ADC 132. Control then proceeds to block 508 and performs the I/Q calibration. Control then proceeds to decision block 510 and determines whether one of amplitude correction signal $\alpha_{est}$ 105-1 and phase correction signal $\beta_{est}$ 105-2 crossed zero. If so, then control branches to block 512 and increments a counter. Control then proceeds to decision block 514 and determines whether the counter value has exceeded a predetermined count limit. If not, then control returns to block 508 and continues with I/Q calibration. On the other hand, if control determines that the counter value exceeded the predetermined count limit in decision block 514 then control branches to block 516. In block 516 control resets the I/Q related parameters and changes the phase of the signal from reference signal generator 103. Control can change the phase by a predetermined amount. Control then proceeds from block 516 to block 506 to derotate the output of ADC 132 and restart the I/Q calibrations.

Control branches from decision block 510 to block 518 when amplitude correction signal $\alpha_{est}$ 105-1 and phase correction signal $\beta_{est}$ 105-2 have not crossed zero. In block 518 control determines whether the magnitude of at least one of amplitude correction signal $\alpha_{est}$ 105-1 and phase correction signal $\beta_{est}$ 105-2 has exceeded a respective predetermined limit. If so, then control branches to block 516 to change the phase of reference signal generator 103 and restart the I/Q calibration process. On the other hand, if the result in decision block 518 is false then control proceeds to decision block 510 and determines whether the values of amplitude correction signal $\alpha_{est}$ 105-1 and phase correction signal $\beta_{est}$ 105-2 have converged. If not, then control branches to block 508 and continues with the I/Q calibration process. On the other hand, if the values of amplitude correction signal $\alpha_{est}$ 105-1 and phase correction signal $\beta_{est}$ 105-2 have converged then control exits through block 522.

Figure 12:
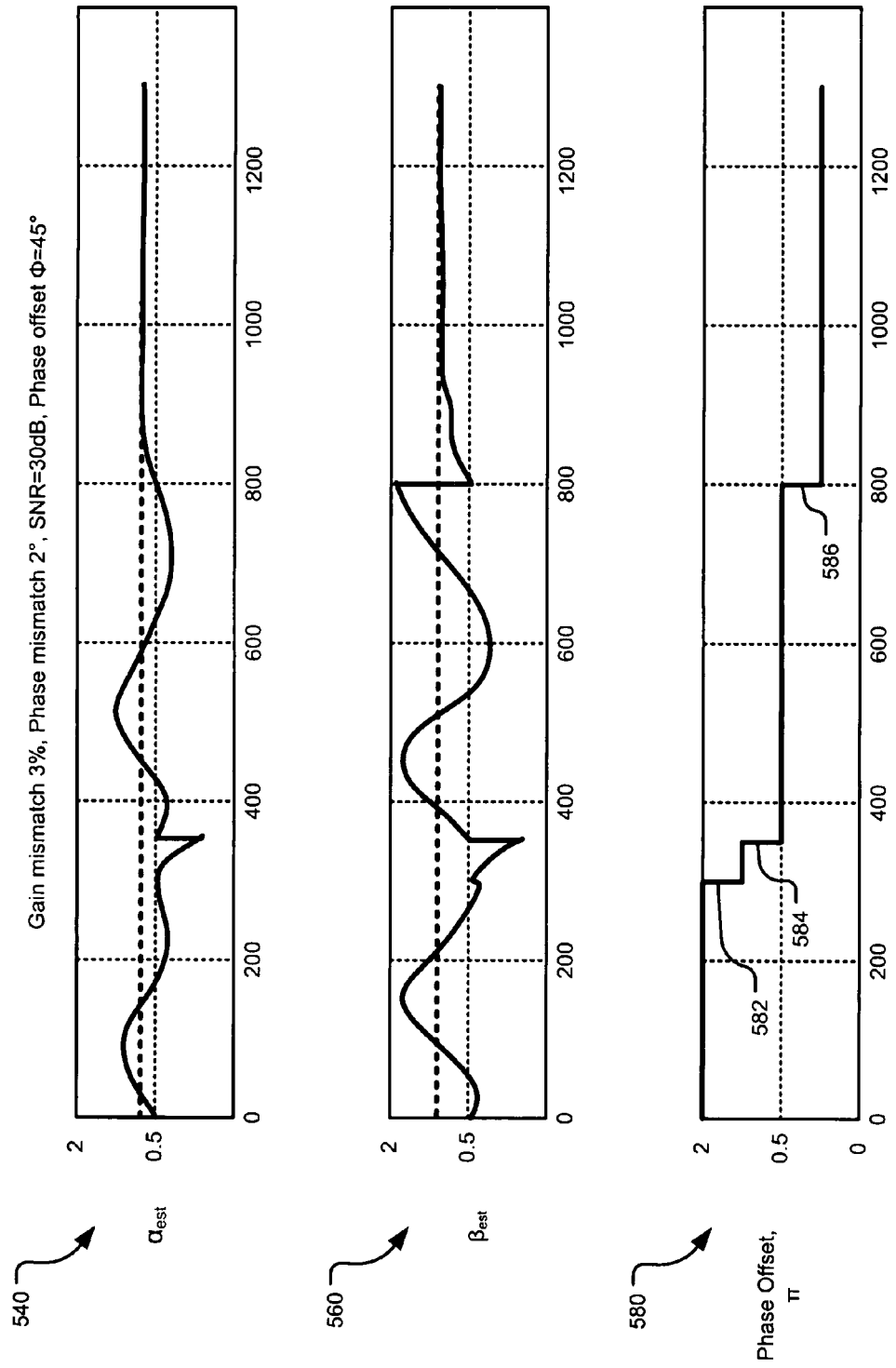
FIG. 12 is a first plot of converging amplitude and phase estimations as the method of FIG. 11 is executed.
Figure 13:
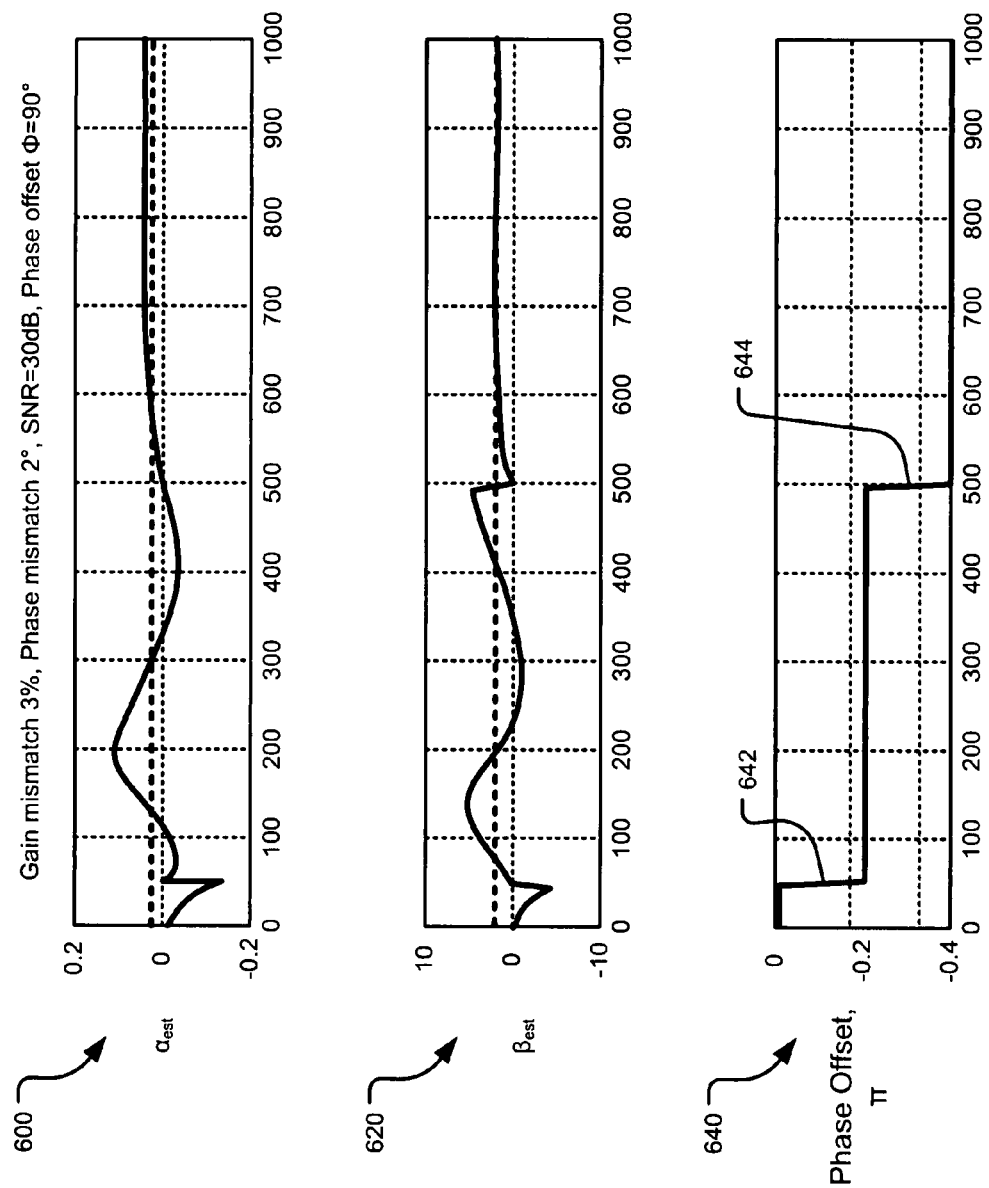
FIG. 13 is a second plot of amplitude and phase estimations as the method of FIG. 11 is executed.

Referring now to FIGS. 12 and 13, plots of the amplitude correction signal $\alpha_{est}$ 105-1 and phase correction signal $\beta_{est}$ 105-2 are shown with phase stepper module 402 active. The plots of FIGS. 12 and 13 can be compared to the plots of FIGS. 9 and 10, respectively, to see the effect of method 500 and phase stepper module 402.

Referring now to FIG. 12, a gain plot 540 and a phase plot 560 show respective ones of amplitude correction signal $\alpha_{est}$ 105-1 and phase correction signal $\beta_{est}$ 105-2 as method 500 executes. A phase-offset plot 580 shows the corresponding output of phase stepper module 402. The plots are generated with a signal-to-noise ratio (SNR) of 30 dB, an I/Q phase mismatch of 2°, an I/Q gain mismatch of 3%, and phase offset φ=45°. The horizontal axis represents iterations of the amplitude and phase mismatch estimates.

At a time 582 the amplitude correction signal $\alpha_{est}$ 105-1 and/or phase correction signal $\beta_{est}$ 105-2 exceeds the predetermined number of zero crossings. Method 500 therefore changes the phase of reference signal generator 103. At a time 584 the magnitude of amplitude correction signal $\alpha_{est}$ 105-1 and/or phase correction signal $\beta_{est}$ 105-2 exceed respective limits. Method 500 therefore changes the phase of reference signal generator 103 once again. At a time 586 amplitude correction signal $\alpha_{est}$ 105-1 and phase correction signal $\beta_{est}$ 105-2 again exceed the predetermined number of zero crossings. Method 500 therefore changes the phase of reference signal generator 103 once again. After time 586 the phase of reference signal generator 103 substantially cancels the effect of phase offset φ on the I/Q calibration process and amplitude correction signal $\alpha_{est}$ 105-1 and phase correction signal $\beta_{est}$ 105-2 converge on respective values of I/Q gain and phase mismatches.

Referring now to FIG. 13, a gain plot 600 and a phase plot 620 show respective ones of amplitude correction signal $\alpha_{est}$ 105-1 and phase correction signal $\beta_{est}$ 105-2 as method 500 executes. A phase-offset plot 640 shows the corresponding output of phase stepper module 402. The plots are generated with a signal-to-noise ratio (SNR) of 30 dB, an I/Q phase mismatch of 2°, an I/Q gain mismatch of 3%, and phase offset φ=90°. The horizontal axis represents iteration numbers of the amplitude and phase mismatch estimates.

At a time 642 amplitude correction signal $\alpha_{est}$ 105-1 and/or phase correction signal $\beta_{est}$ 105-2 have exceeded respective limits. Method 500 therefore changes the phase of reference signal generator 103. At a time 644 amplitude correction signal $\alpha_{est}$ 105-1 and/or phase correction signal $\beta_{est}$ 105-2 have exceeded the predetermined number of zero crossings. Method 500 therefore changes the phase of reference signal generator 103. After time 644 the phase of reference signal generator 103 substantially cancels the effect of phase offset φ on the I/Q calibration process and amplitude correction signal $\alpha_{est}$ 105-1 and phase correction signal $\beta_{est}$ 105-2 converge on respective values of I/Q gain and phase mismatches.

Figure 14B:
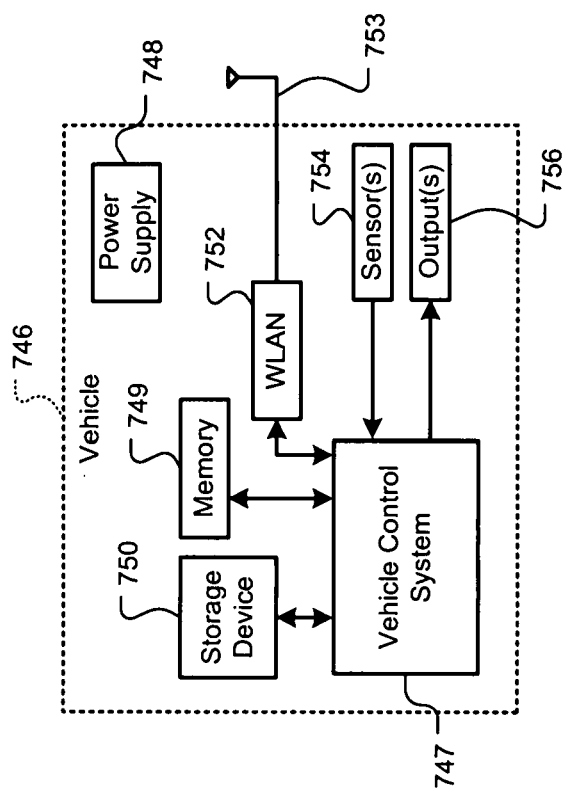
FIG. 14B is a functional block diagram of a vehicle control system.
Figure 14A:
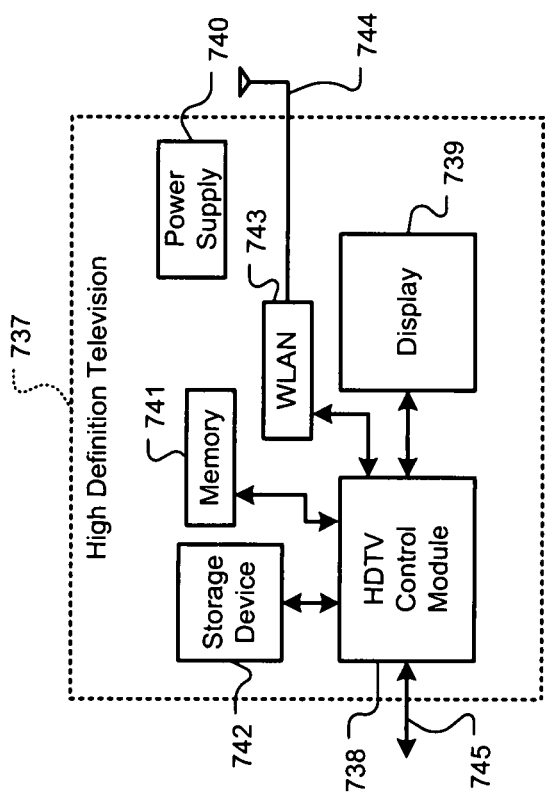
FIG. 14A is a functional block diagram of a high definition television.

Referring now to FIG. 14A, the teachings of the disclosure can be implemented in an I/Q-mismatch compensated transceiver of a WLAN interface 743 that is included in a high definition television (HDTV) 737. The HDTV 737 includes a HDTV control module 738, a display 739, a power supply 740, memory 741, a storage device 742, the WLAN interface 743 and associated antenna 744, and an external interface 745.

The HDTV 737 can receive input signals from the WLAN interface 743 and/or the external interface 745, which sends and receives information via cable, broadband Internet, and/or satellite. The HDTV control module 738 may process the input signals, including encoding, decoding, filtering, and/or formatting, and generate output signals. The output signals may be communicated to one or more of the display 739, memory 741, the storage device 742, the WLAN interface 743, and the external interface 745.

Memory 741 may include random access memory (RAM) and/or nonvolatile memory such as flash memory, phase change memory, or multi-state memory, in which each memory cell has more than two states. The storage device 742 may include an optical storage drive, such as a DVD drive, and/or a hard disk drive (HDD). The HDTV control module 738 communicates externally via the WLAN interface 743 and/or the external interface 745. The power supply 740 provides power to the components of the HDTV 737.

Referring now to FIG. 14B, the teachings of the disclosure may be implemented in an I/Q-mismatch compensated transceiver of a WLAN interface 752 that is included in a vehicle 746. The vehicle 746 may include a vehicle control system 747, a power supply 748, memory 749, a storage device 750, and the WLAN interface 752 and associated antenna 753. The vehicle control system 747 may be a powertrain control system, a body control system, an entertainment control system, an anti-lock braking system (ABS), a navigation system, a telematics system, a lane departure system, an adaptive cruise control system, etc.

The vehicle control system 747 may communicate with one or more sensors 754 and generate one or more output signals 756. The sensors 754 may include temperature sensors, acceleration sensors, pressure sensors, rotational sensors, airflow sensors, etc. The output signals 756 may control engine operating parameters, transmission operating parameters, suspension parameters, etc.

The power supply 748 provides power to the components of the vehicle 746. The vehicle control system 747 may store data in memory 749 and/or the storage device 750. Memory 749 may include random access memory (RAM) and/or nonvolatile memory such as flash memory, phase change memory, or multi-state memory, in which each memory cell has more than two states. The storage device 750 may include an optical storage drive, such as a DVD drive, and/or a hard disk drive (HDD). The vehicle control system 747 may communicate externally using the WLAN interface 752.

Figure 14D:
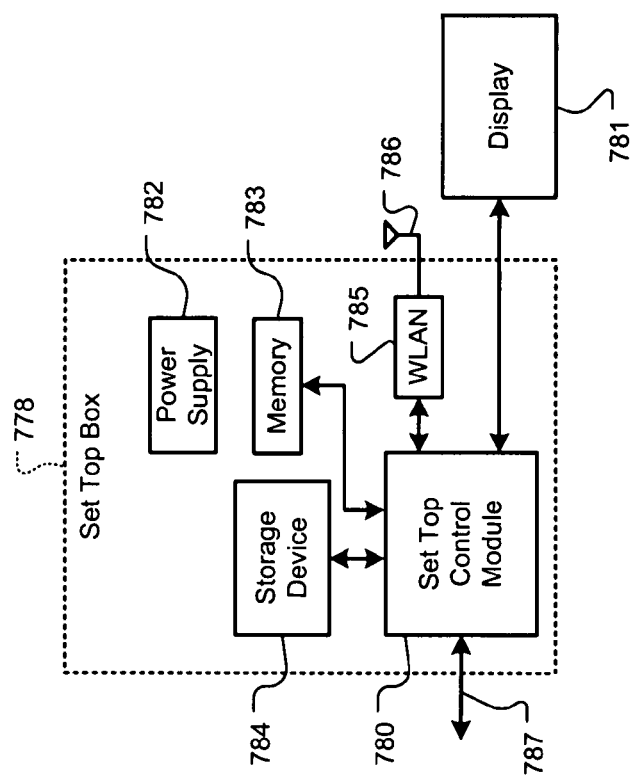
FIG. 14D is a functional block diagram of a set top box.
Figure 14C:
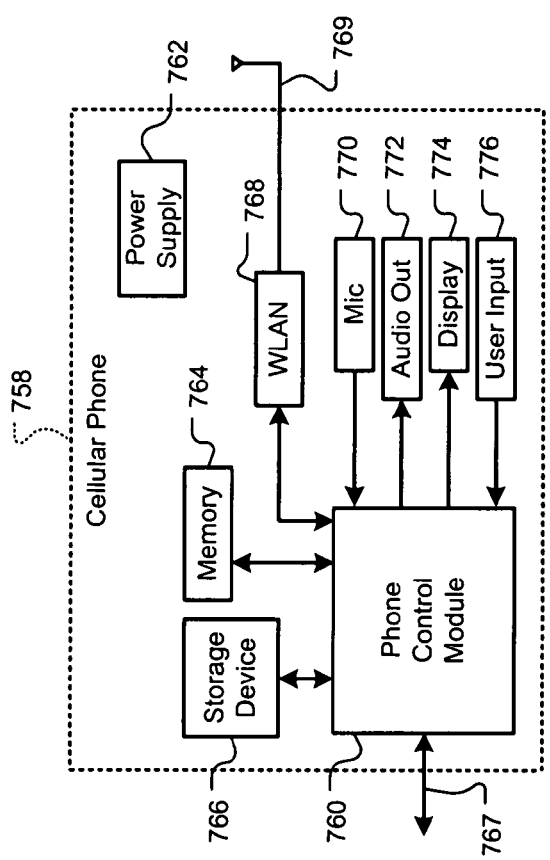
FIG. 14C is a functional block diagram of a cellular phone.

Referring now to FIG. 14C, the teachings of the disclosure can be implemented in an I/Q-mismatch compensated transceiver of a WLAN interface 768 that is included in a cellular phone 758. The cellular phone 758 includes a phone control module 760, a power supply 762, memory 764, a storage device 766, and a cellular network interface 767. The cellular phone 758 may include the WLAN interface 768 and associated antenna 769, a microphone 770, an audio output 772 such as a speaker and/or output jack, a display 774, and a user input device 776 such as a keypad and/or pointing device.

The phone control module 760 may receive input signals from the cellular network interface 767, the WLAN interface 768, the microphone 770, and/or the user input device 776. The phone control module 760 may process signals, including encoding, decoding, filtering, and/or formatting, and generate output signals. The output signals may be communicated to one or more of memory 764, the storage device 766, the cellular network interface 767, the WLAN interface 768, and the audio output 772.

Memory 764 may include random access memory (RAM) and/or nonvolatile memory such as flash memory, phase change memory, or multi-state memory, in which each memory cell has more than two states. The storage device 766 may include an optical storage drive, such as a DVD drive, and/or a hard disk drive (HDD). The power supply 762 provides power to the components of the cellular phone 758.

Referring now to FIG. 14D, the teachings of the disclosure can be implemented in an I/Q-mismatch compensated transceiver of a WLAN interface 785 that is included in a set top box 778. The set top box 778 includes a set top control module 780, a display 781, a power supply 782, memory 783, a storage device 784, and the WLAN interface 785 and associated antenna 786.

The set top control module 780 may receive input signals from the WLAN interface 785 and an external interface 787, which can send and receive information via cable, broadband Internet, and/or satellite. The set top control module 780 may process signals, including encoding, decoding, filtering, and/or formatting, and generate output signals. The output signals may include audio and/or video signals in standard and/or high definition formats. The output signals may be communicated to the WLAN interface 785 and/or to the display 781. The display 781 may include a television, a projector, and/or a monitor.

The power supply 782 provides power to the components of the set top box 778. Memory 783 may include random access memory (RAM) and/or nonvolatile memory such as flash memory, phase change memory, or multi-state memory, in which each memory cell has more than two states. The storage device 784 may include an optical storage drive, such as a DVD drive, and/or a hard disk drive (HDD).

Figure 14E:
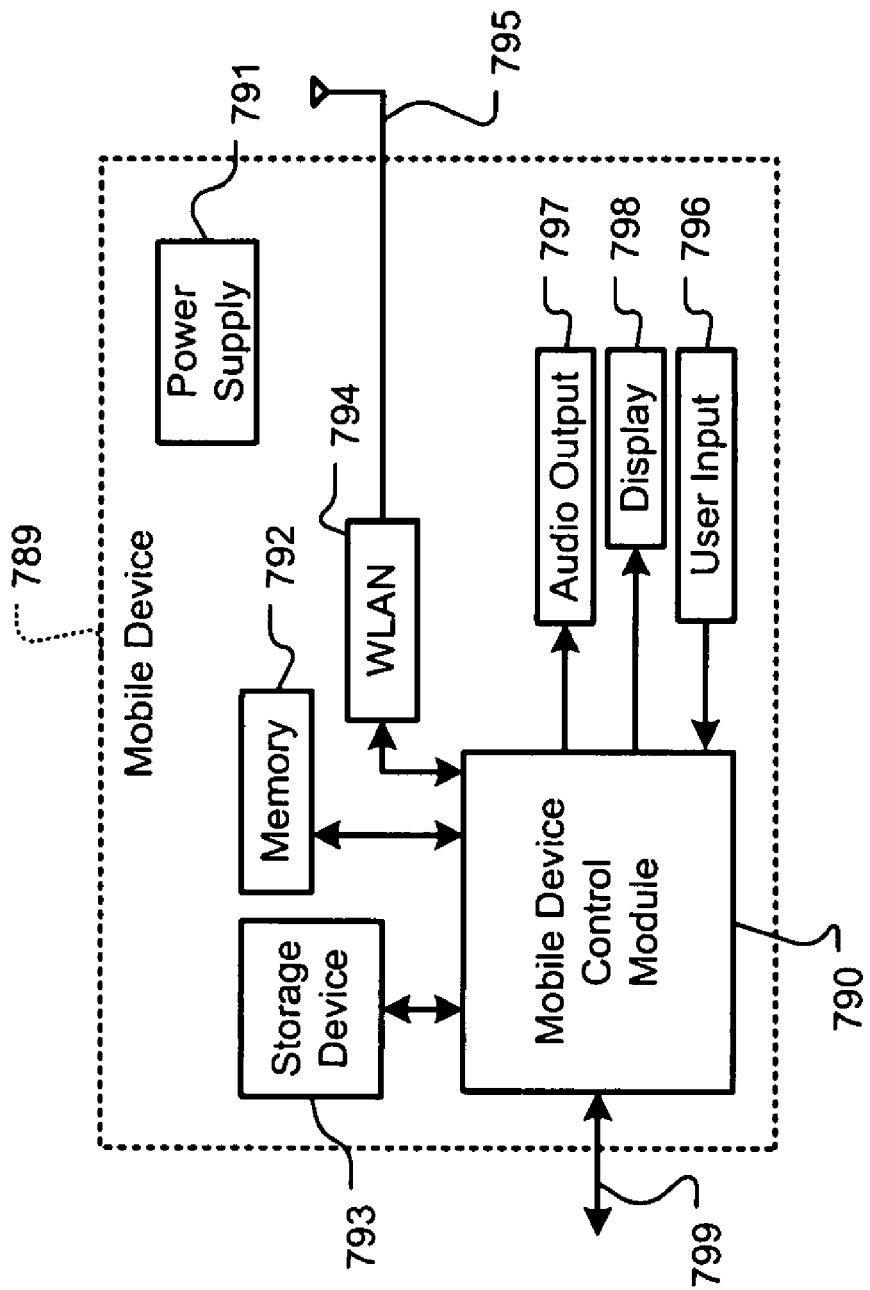
FIG. 14E is a functional block diagram of a mobile device.

Referring now to FIG. 14E, the teachings of the disclosure can be implemented in an I/O-mismatch compensated transceiver of a WLAN interface 794 that is included in a mobile device 789. The mobile device 789 may include a mobile device control module 790, a power supply 791, memory 792, a storage device 793, a WLAN interface 794 and associated antenna 795, and an external interface 799.

The mobile device control module 790 may receive input signals from the WLAN interface 794 and/or the external interface 799. The external interface 799 may include USB, infrared, and/or Ethernet. The input signals may include compressed audio and/or video, and may be compliant with the MP3 format. Additionally, the mobile device control module 790 may receive input from a user input 796 such as a keypad, touchpad, or individual buttons. The mobile device control module 790 may process input signals, including encoding, decoding, filtering, and/or formatting, and generate output signals.

The mobile device control module 790 may output audio signals to an audio output 797 and video signals to a display 798. The audio output 797 may include a speaker and/or an output jack. The display 798 may present a graphical user interface, which may include menus, icons, etc. The power supply 791 provides power to the components of the mobile device 789. Memory 792 may include random access memory (RAM) and/or nonvolatile memory such as flash memory, phase change memory, or multi-state memory, in which each memory cell has more than two states. The storage device 793 may include an optical storage drive, such as a DVD drive, and/or a hard disk drive (HDD). The mobile device may include a personal digital assistant, a media player, a gaming console or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An in-phase and quadrature (I/O) calibration system for a quadrature amplitude modulation (QAM) mode transceiver, the I/Q calibration system comprising:
   a signal generator configured to generate a reference in-phase (I) signal and a reference quadrature (Q) signal;
   an I/Q mismatch compensation module configured to generate a compensated I signal and a compensated Q signal based on (i) the reference I signal, (ii) the reference Q signal, (iii) an amplitude correction signal, and (iv) a phase correction signal;
   an I/Q mismatch calibration module configured to generate the amplitude correction signal and the phase correction signal; and
   a phase stepper module configured to vary a phase of at least one of the reference I signal or the reference Q signal based on (i) the amplitude correction signal and (ii) the phase correction signal.

2. The I/Q calibration system of claim 1, further comprising:
   a transmit analog mixer module configured to generate a QAM signal based on (i) the compensated I signal and (ii) the compensated Q signal; and
   a receive analog mixer configured to, based on the QAM signal, generate a received I signal and a received Q signal,
   wherein the compensated I signal and the compensated Q signal are respectively related to the received I signal and the received Q signal by a phase offset, and
   wherein the phase stepper module reduces the phase offset.

3. The I/Q calibration system of claim 2, further comprising an analog-to-digital converter configured to convert the received I signal and the received Q signal from analog formats to respective digital representations,
   wherein the I/Q mismatch calibration module is configured to, based on the digital representations, generate the amplitude correction signal and the phase correction signal.

4. The I/Q calibration system of claim 1, wherein the phase stepper module is configured to vary the phase of the at least one of the reference I signal or the reference Q signal when a magnitude of at least one of the amplitude correction signal or the phase correction signal exceeds a predetermined magnitude.

5. The I/Q calibration system of claim 1, wherein the phase stepper module is configured to vary the phase of the at least one of the reference I signal or the reference Q signal based on at least one of the amplitude correction signal or the phase correction signal crossing zero more than a predetermined number of times.

6. The I/Q calibration system of claim 1, wherein the phase stepper module is configured to correct I/Q mismatch of a radio frequency (RF) transmitter by varying the phase of the at least one of the reference I signal or the Q signal based on (i) the amplitude correction signal and (ii) the phase correction signal.

7. The I/Q calibration system of claim 1, wherein the phase stepper module is configured to perform the varying of the phase of the at least one of the reference I signal or the reference Q signal prior to (i) digital to analog conversion of the compensated I signal and the compensated Q signal and (ii) upconversion of the compensated I signal and the compensated Q signal.

8. The I/Q calibration system of claim 1, wherein:
   the compensated I signal is a digital I signal; and
   the compensated Q signal is a digital Q signal.

9. The I/Q calibration system of claim 1, wherein the phase stepper module is configured to vary the phase of the at least one of the reference I signal and the reference Q signal by varying phase of the signal generator.

10. The I/Q calibration system of claim 1, wherein:
    the compensated I signal does not include a Q component; and
    the compensated Q signal does not include an I component.

11. The I/Q calibration system of claim 1, wherein:
    the I/Q mismatch calibration module is configured to generate the amplitude correction signal and the phase correction signal based on (i) a detected I component and (ii) a detected Q component of a first signal; and
    the I/Q calibration system further comprises a mixer configured to generate the first signal based on a detected I component of a signal transmitted between (i) a transmit mixer module and (ii) a receive mixer module.

12. The I/Q calibration system of claim 11, wherein the I/Q mismatch calibration module generates the amplitude correction signal based on (i) an absolute value of the I component and (ii) an absolute value of the Q component.

13. The I/Q calibration system of claim 1, wherein the phase stepper module, when varying the phase of the at least one of the reference I signal and the reference Q signal, varies at least one of
    a phase of the reference I signal relative a phase of the reference Q signal; or
    the phase of the reference Q signal relative the phase of the reference I signal.

14. The I/Q calibration system of claim 1, wherein the phase stepper module minimizes effects of phase offset on the amplitude correction signal and the phase correction signal when varying the phase of the at least one of the reference I signal or the reference Q signal.

15. A self-calibrating quadrature amplitude modulation (QAM) mode transceiver comprising:
    a transmitter comprising
      a generator configured to generate a digitized in-phase (I) signal and a digitized quadrature (Q) signal,
      a compensation module configured to generate a compensated I signal and a compensated Q signal based on (i) the digitized I signal, (ii) the digitized Q signal, (iii) the amplitude correction signal, and (iv) the phase correction signal,
      a digital-to-analog converter module configured to generate an analog I signal and an analog Q signal based on (i) the compensated I signal and (ii) the compensated Q signal, and
      a first analog mixer module configured to generate a radio-frequency (RF) transmit signal based on (i) the analog I signal and (ii) the analog Q signal;
    a calibration module configured to generate the amplitude correction signal and the phase correction signal based on an analog I signal component of the RF transmit signal; and
    a phase stepper module configured to vary a phase of at least one of the digitized in-phase (I) signal or the digitized quadrature (Q) signal based on the amplitude correction signal and (ii) the phase correction signal.

16. The transceiver of claim 15, further comprising a receiver comprising:
    a second analog mixer module configured to generate an I component signal based on the RF transmit signal, wherein the I component signal includes an analog Q crosstalk signal, and wherein the I component signal and the analog Q crosstalk signal are respectively related to the analog I signal and the analog Q signal by a phase offset;

an analog-to-digital converter (ADC) configured to convert the I component signal to a digitized I component signal; and a digital mixer configured to generate a reconstructed digitized I signal and a digitized Q crosstalk signal based on the digitized I component signal, wherein the calibration module is configured to generate the amplitude correction signal and the phase correction signal based on (i) the reconstructed digitized I signal and (ii) the digitized Q crosstalk signal, and wherein the phase stepper module is configured to vary the phase offset by varying the phase of the at least one of the digitized I signal or the digitized Q signal based on (i) the amplitude correction signal and (ii) the phase correction signal.

17. The transceiver of claim 16, wherein the phase stepper module is configured to vary the phase of the at least one of the digitized I signal or the digitized Q signal by a predetermined amount.

18. The transceiver of claim 16, wherein the second analog mixer module is further configured to generate a Q component signal based on the RF transmit signal.

19. The transceiver of claim 16, wherein the receiver further comprises a band-pass filter (BPF) positioned between the second analog mixer module and the ADC.

20. The transceiver of claim 19, further comprising a switch configured to selectively route the I component signal around the BPF.

21. An in-phase and quadrature (I/Q) calibration system for a quadrature amplitude modulation (QAM) mode transceiver, the I/Q calibration system comprising:

signal generator means for generating a reference in-phase (I) signal and a reference quadrature (Q) signal;

I/Q mismatch compensation means for generating a compensated I signal and a compensated Q signal based on (i) the reference I signal, (ii) the reference Q signal, (iii) an amplitude correction signal, and (iv) a phase correction signal;

I/Q mismatch calibration means for generating the amplitude correction signal and the phase correction signal; and phase stepper means for varying a phase of the reference I signal and the reference Q signal based on the amplitude correction signal and the phase correction signal.

22. The I/Q calibration system of claim 21, further comprising:

transmit analog mixer means for generating a QAM signal based on (i) the compensated I signal and (ii) the compensated Q signal; and receive analog mixer means for generating a received I signal and a received Q signal based on the QAM signal, wherein the compensated I signal and the compensated Q signal are respectively related to the received I signal and the received Q signal by a phase offset, and wherein the phase stepper means reduces the phase offset.

23. The I/Q calibration system of claim 22, further comprising analog-to-digital converter means for converting the received I signal and the received Q signal from analog formats to respective digital representations, wherein the I/Q mismatch calibration means generates the amplitude correction signal and the phase correction signal based on the digital representations.

24. The I/Q calibration system of claim 21, wherein phase stepper means varies the phase of the at least one of the reference I signal or the reference Q signal when the magnitude of at least one of the amplitude correction signal or the phase correction signal exceeds a predetermined magnitude.

25. The I/Q calibration system of claim 21, wherein the phase stepper means varies the phase of the at least one of the reference I signal or the reference Q signal based on at least one of the amplitude correction signal and the phase correction signal crossing zero more than a predetermined number of times.

26. A self-calibrating quadrature amplitude modulation (QAM) mode transceiver comprising:

a transmitter comprising generator means for generating a digitized in-phase (I) signal and a quadrature (Q) signal compensation means for generating a compensated I signal and a compensated Q signal based on (i) the digitized I signal, (ii) the digitized Q signal, (iii) an amplitude correction signal, and (iv) a phase correction signal digital-to-analog converter means for generating an analog I signal and a Q signal based on (i) the compensated I signal and (ii) the compensated Q signal and first analog mixer means for generating a radio-frequency (RF) transmit signal based on (i) the analog I signal and the analog (ii) Q signal;

calibration means for generating the amplitude correction signal and the phase correction signal based on the analog I signal component of the RF transmit signal; and phase stepper means for varying a phase of at least one of the digitized in-phase (I) signal or the digitized quadrature (Q) signal based on (i) the amplitude correction signal and (ii) the phase correction signal.

27. The transceiver of claim 26, further comprising a receiver comprising:

second analog mixer means for generating an I component signal based on the RF transmit signal, wherein the I component signal includes an analog Q crosstalk signal, and wherein the I component signal and the Q crosstalk signal are respectively related to the analog I signal and the analog Q signal by a phase offset;

analog-to-digital converter (ADC) means for converting the I component signal to a digitized I component signal; and digital mixer means for generating a reconstructed digitized I signal and a reconstructed digitized Q crosstalk signal based on the digitized I component signal, wherein the calibration means generates the amplitude correction signal and the phase correction signal based on (i) the reconstructed digitized I signal and (ii) the reconstructed digitized Q crosstalk signal, and wherein the phase stepper means varies the phase offset by varying the phase of the at least one of the digitized I signal or the digitized Q signal based on La the amplitude correction signal and (ii) the phase correction signal.

28. The transceiver of claim 27, wherein the phase stepper means varies the phase of the at least one of the digitized I signal or the digitized Q signal by a predetermined amount.

29. The transceiver of claim 27, wherein the second analog mixer means further generates a Q component signal based on the RF transmit signal.

30. The transceiver of claim 27, wherein the receiver further comprises band-pass filter (BPF) means positioned between the second analog mixer means and the ADC.

31. The transceiver of claim 30, further comprising switch means for selectively routing the I component signal around the BPF.

32. A method of calibrating a quadrature amplitude modulation (QAM) mode transceiver, the method comprising:
- generating a reference in-phase (I) signal and a reference quadrature (Q) signal via a signal generator;
- generating an amplitude correction signal and a phase correction signal via a mismatch calibration module;
- generating a compensated I signal and a compensated Q signal via I/Q mismatch compensation module based on (i) the reference I signal (ii) the reference Q signal, (iii) the amplitude correction signal, and (iv) the phase correction signal; and
- varying a phase of the at least one of the reference I signal or the reference Q signal via a phase stepper module based on the amplitude correction signal and the phase correction signal.

33. The method of claim 32, further comprising:
- generating a QAM signal based on the compensated I signal and the compensated Q signal; and
- generating a received I signal and a received Q signal based on the QAM signal, wherein the compensated I signal and the compensated Q signal are respectively related to the received I signal and the received Q signal by a phase offset, and
- wherein varying the phase of the at least one of the reference I signal or the reference Q signal reduces the phase offset.

34. The method of claim 33, further comprising:
- converting the received I signal and the received Q signal from analog formats to respective digital representations; and
- generating the amplitude correction signal and the phase correction signal based on the digital representations.

35. The method of claim 32, further comprising varying the phase of the at least one of the reference I signal and the reference Q signal when a magnitude of at least one of the amplitude correction signal or the phase correction signal exceeds a predetermined magnitude.

36. The method of claim 32, further comprising varying the phase of the at least one of the reference I signal or the reference Q signal based on at least one of the amplitude correction signal or the phase correction signal crossing zero more than a predetermined number of times.

37. A method of calibrating a quadrature amplitude modulation (QAM) mode transceiver, the method comprising:
- generating a digitized in-phase (I) signal and a digitized quadrature (Q) signal via a signal generator;
- generating an amplitude correction signal and a phase correction signal via I/Q mismatch calibration module based on an analog I signal component of a RF transmit signal;
- generating a compensated I signal and a compensated Q signal via I/Q mismatch compensation module based on (i) the digitized I signal, (ii) the digitized Q signal, (iii) the amplitude correction signal, and (iv) the phase correction signal;
- generating an analog I signal and an analog Q signal based on (i) the compensated I signal and (ii) the compensated Q signal; and
- varying a phase of the at least one of the digitized in-phase (I) signal or the quadrature (Q) signal via a phase stepper module based on (i) the amplitude correction signal and (ii) the phase correction signal.

38. The method of claim 37, further comprising:
- generating an I component signal based on the RF transmit signal, wherein the I component signal includes an analog Q crosstalk signal, and wherein the I component signal and the Q crosstalk signal are respectively related to the analog I signal and the Q signal by a phase offset;
- converting the I component signal to a digitized I component signal; and
- generating a reconstructed digitized I signal and a digitized Q crosstalk signal based on the digitized I component signal;
- generating the amplitude correction signal and the phase correction signal based on the reconstructed digitized I signal and the digitized Q crosstalk signal; and
- varying the phase of the at least one of the digitized I signal or the digitized Q signal based on the amplitude correction signal and the phase correction signal and thereby varying the phase offset.

39. The method of claim 38, wherein the phase of the at least one of the digitized I signal or the digitized Q signal is varied by a predetermined amount.

40. The method of claim 38, further comprising generating a Q component signal based on the RF transmit signal.

41. The method of claim 38, further comprising band-pass filtering (BPF) the I-component signal.

42. The transceiver of claim 41, further comprising selectively routing the I component signal around the BPF.

* * * * *